United States Patent [19]
Baron et al.

[11] Patent Number: 5,318,851
[45] Date of Patent: Jun. 7, 1994

[54] EPOXY RESINS CONTAINING BOUND LIGHT STABILIZING GROUPS

[75] Inventors: Arthur L. Baron; Ronald E. MacLeay, both of Amherst; Jennifer P. Kmiec, Kenmore, all of N.Y.

[73] Assignee: Elf Atochem N.A., Inc., Philadelphia, Pa.

[21] Appl. No.: 29,219

[22] Filed: Apr. 2, 1993

Related U.S. Application Data

[62] Division of Ser. No. 679,872, Apr. 3, 1991, Pat. No. 5,213,897.

[51] Int. Cl.$^5$ .................... C08G 59/40; C08G 65/00
[52] U.S. Cl. .................... 428/413; 524/91; 524/99; 524/102; 525/109; 525/113; 525/396; 525/423; 525/510; 525/519; 525/523; 525/526; 525/533; 528/27; 528/99; 528/103; 528/109; 528/111; 528/114; 528/118; 528/341; 528/361
[58] Field of Search .............. 428/413; 525/510, 519, 525/523, 526, 533, 109, 113, 396, 423; 528/27, 99, 103, 109, 111, 114, 118, 341, 361; 524/99, 91, 102

[56] References Cited

U.S. PATENT DOCUMENTS

| | | |
|---|---|---|
| 2,847,395 | 8/1954 | Wear .................................... 260/47 |
| 3,014,009 | 12/1961 | Levine .................................. 260/47 |
| 3,102,043 | 8/1963 | Winthrop et al. .................... 117/21 |
| 3,530,173 | 9/1970 | Aelony ................................. 260/519 |
| 3,876,606 | 4/1975 | Kehr .................................... 117/132 |
| 4,292,195 | 9/1981 | Morris ................................. 252/401 |
| 4,371,644 | 2/1983 | Soma et al. ......................... 524/102 |
| 4,377,680 | 3/1983 | Sponseller et al. ................. 528/123 |
| 4,448,949 | 5/1984 | Ito et al. .............................. 528/99 |
| 4,450,267 | 5/1984 | Ito et al. .............................. 528/99 |
| 4,469,829 | 9/1984 | Konietzny et al. ................. 324/103 |
| 4,480,084 | 10/1984 | Kordomenos et al. ............. 528/118 |
| 4,530,991 | 7/1985 | Hirai et al. .......................... 528/123 |
| 4,544,691 | 10/1985 | Dexter et al. ....................... 524/99 |
| 4,544,733 | 10/1985 | Hirai et al. .......................... 528/123 |
| 4,585,693 | 4/1986 | DeBergalis et al. ................ 428/324 |
| 4,585,698 | 4/1986 | Anzai et al. ......................... 428/413 |
| 4,771,091 | 9/1988 | Ertl ...................................... 524/97 |
| 4,797,436 | 1/1989 | Ertl et al. ............................ 524/97 |
| 4,801,660 | 1/1989 | Zahir et al. .......................... 525/481 |
| 4,855,084 | 8/1989 | Duthaler et al. .................... 260/377 |
| 4,927,891 | 5/1990 | Kamath et al. ..................... 525/327.3 |
| 4,981,914 | 1/1991 | Macleay et al. ..................... 525/327.6 |

FOREIGN PATENT DOCUMENTS

| | | |
|---|---|---|
| 0003542 | 8/1979 | European Pat. Off. . |
| 0019103 | 11/1980 | European Pat. Off. . |
| 0154455 | 9/1985 | European Pat. Off. . |
| 1568725 | 6/1980 | United Kingdom . |
| 157999 | 9/1980 | United Kingdom . |

OTHER PUBLICATIONS

Encyclopedia of Polymer, Science & Techn., p. 235, vol. 6 "Epoxy Resins".
Plastics Manuf., vol. 104, '86, Abstracting from Japanese 85, 168-717.
Chemical Abstracts, vol. 101, '84, Encapsulation of semiconductor devices JP Kokai Tokkyo Koho JP 59,109,519 abstracting from 84,109,519.
Chemical Abstracts, vol. 101, '84, JPN. Kokai Tokkyo Koho JP 59,113,022 abstracting from Japanese 84,113,022.
Chemical Abstracts, vol. 102, '85; 102:25728f "Crosslinking of Epoxy Resins" Jpn. Kokai Tokkyo Koho abstracting from Japanese 84,164,321.
Plastics Manuf., vol. 91, '79, abstracting from Japanese 79,04,994 Epoxy Resin Compositions.
Chemical Abstracts, vol. 100:7844v Curing agents for epoxy resins Abstracting French 2,517,304.
Chemical Abstracts, vol. 97 '82; High-molecular-weight, noncrosslinked epoxy polyadducts. Abstracting German DD 155,324.
Chemical Abstracts, vol. 104, '86; Epoxy resin powders. Abstracting Japanese 85,168,729.
Chemical Abstracts; vol. 94, '81; Epoxy resin containing phenol groups.
Chemical Abstracts; CA110(20):174861M; Abstrating, "Macromolecular phenolic Antioxidant Based on Epoxy Polydienes".
Journal of Applie Polymer Science; vol. 21, 915–922 (1977), "Thermal Properties of Higher Molecular Weight Light Stabilizers of the Benzophenone Type".
Collected Papers on Macromolecules (Kobunshi Ronbushu); vol. 37, No. 12, pp. 765-771 (Dec. 1980).

Primary Examiner—Frederick Krass
Attorney, Agent, or Firm—Royal F. Bright; Stanley A. Marcus

[57] ABSTRACT

Curable compositions which are precursors for cured or partially cured light stabilized epoxy resins which are the product of the reaction of some or all of the epoxy groups of an epoxy resin with an N-(2,2,6,6-tetraalkyl-4-piperidinyl)amic acid hydrazide as well as the cured or partially cured reaction products thereof together with processes for their use and articles of manufacture produced thereby are disclosed.

30 Claims, No Drawings

EPOXY RESINS CONTAINING BOUND LIGHT STABILIZING GROUPS

This is a divisional of copending application Ser. No. 07/679,872 filed on Apr. 3, 1991 now U.S. Pat. No. 5,213,897 International Application filed on and which designated the U.S.

BACKGROUND OF THE INVENTION

1. Field of the Invention

This invention relates to polymer bound light stabilizers, to curable compositions and to curing processes employing such curable compositions for providing same, more particularly this invention provides cured or partially cured epoxy resins containing bound light stabilizing groups. Still more particularly this invention provides light stabilized epoxy resins which are the product of the reaction of A) some of the epoxy groups of an epoxy resin composition an average of 1.75 or more epoxide groups per molecule with B) a hydrazido functionalized hindered amine light stabilizer of Formula I or II or combinations thereof and optionally a hydrazido functionalized 2-(2-hydroxyphenyl)-2H-benzotriazole of Formula III wherein x and the various R groups are as defined hereinafter, and optionally an auxiliary epoxy curing agent.

J. P. 85 168,717.

Kamon and Saito [T. Ramon and K. Saito, Kobunski Ronbunshu 37 (12), 765–771 (1980)]determined the curing mechanism for the reaction of aliphatic dihydrazides with epoxy resins was the reaction of the epoxy group with the active hydrogen atoms on the terminal nitrogen atoms of the dihydrazide similar to the reaction of epoxy resins with diamines. The resins cured smoothly when heated above 150° C.

Other examples of using dihydrazides as curing agents include:

JP 84 109,519; JP 84 113,022; JP 84 164,321; JP 79 04,944 and Fr. Demande FR 2,517,304.

U.S. Pat. No. 3,530,173 and East German Patent DD 155,324 (CA 97,183414k) teach the use of cyanocarboxylic acid hydrazide to cure epoxy resin.

However none of the hydrazide compounds described in these references contain light stabilizing groups attached to them. Russian investigators have prepared macromolecular phenolic antioxidants by treating epoxy group-containing butadiene-isoprene copolymer with 3-(2,6-di-t-butyl-4-hydroxyphenyl)propionhydrazide at 150° C. for 6 hours in an inert atmosphere. (N. S. Domnina, E. V. Kornilova, V. S. Shagov, Vestn. Leningr. Univ., Ser. 4: Fiz. Khim. 1988, (3), 69–73 (Russ); C.A. 110 (21): 174861 m.

U.S. Pat. No. 4,855,084 teaches the inclusion of anthraquinone compounds containing hydrazide substitu-

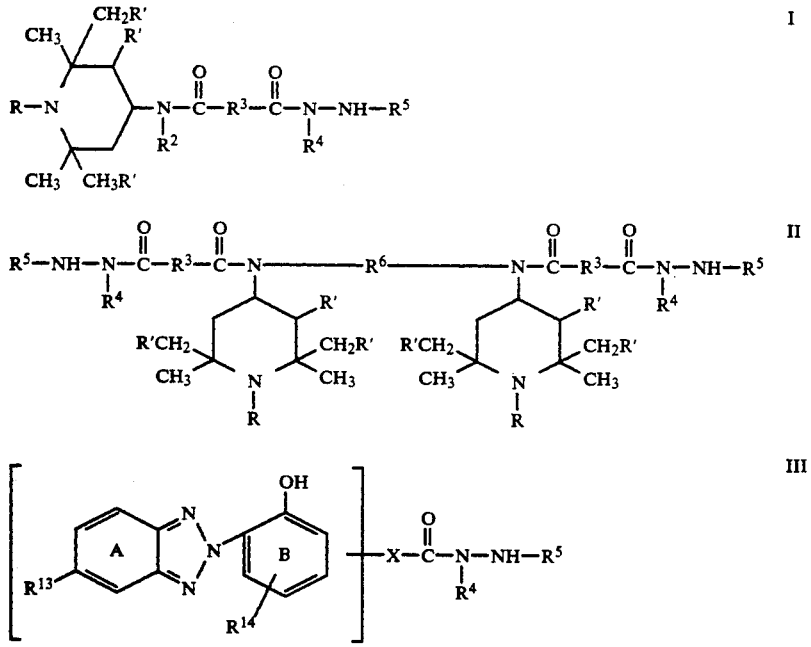

2. Description of the Prior Art

Dihydrazides of carboxylic acids are well known curing agents for epoxy resins. For example see Encyclopedia of Polymer Science and Technology, John Wiley & Sons, Inc., Vol. 6 235 (1967).

U.S. Pat. Nos.: 2,847,395; 3,014,009; 3,102,043; 3,876,606; 4,377,680; 4,585,698.

Numerous patents have recently issued covering structurally different hydrazides as latent curing agents for epoxy resins.

U.S. Pat. Nos. 4,544,733; 4,530,991; 4,448,949, 4,450,267; 4,337,680.

E. P. 154,455.

ents into epoxy resin compositions. The resulting compositions are photosensitive and can be reduced by UV light. They are especially useful in the production of printed circuits.

U.S. Patent Application Ser. No. 275,452 filed Nov. 23, 1988, now U.S. Pat. No. 4,927,891 discloses the attachment of hindered amine light stabilizers containing a hydrazide functionality and hydrazido functionalized 2-(2-hydroxyphenyl)-2H-benzotriazole to acrylic coating resins by reacting them with glycidyl methacrylate segments in the acrylate copolymer. No concrete evidence was presented to demonstrate whether the hydrazide group attacked the epoxy functionality or the ester functionality to become attached to the coating resin. The coatings showed excellent UV stability.

U.S. Patent Application Ser. No. 455,219 filed Dec. 22, 1989 now abandoned discloses the reaction of N-HALS Amic Acid Hydrazides of Formula I with mono glycidyl ethers.

It is well known in the literature to attach light stabilizers to epoxy resins by reacting hydroxy, carboxy, thio or amino-functionalized light stabilizers with resins containing two or more terminal vicinal epoxides. This is normally done to increase the molecular weight of the stabilizer and thereby make it less volatile, less extractable and in many cases more compatible with host polymer systems to be stabilized.

In U.S. Pat. Nos. 4,797,436 and 4,771,091, oligomeric tetraalkylpiperidine light stabilizers were prepared by reacting known polyalkyldiazospirodecanes with epoxides. The products were used to stabilize polymers against the damaging effect of light, heat and oxygen.

U.S. Pat. No. 4,371,644 discloses the reaction of the hindered nitrogen of various 2,2,6,6-tetraalkylpiperidines with epoxides to form 1-substituted 2,2,6,6-tetraalkylpiperidines which have superior stabilizing activity against photo and thermal degradation and are less volatile and less extractable.

U.S. Pat. No. 4,480,084 teaches chain extending polyalkylpiperidines on the hindered nitrogen with an excess of epoxy resin to form a diepoxide functional polymer which is then capped with hydroxy functional monomer to provide a crosslinkable polymeric hindered amine light stabilizer particularly suitable for use in coating compositions.

British Patent 1,574,999 and European Patent 003,542 also teach the preparation of polymeric light stabilizers by reacting the hindered nitrogen of various polyalkyl-piperidines with various epoxy resins.

British Patent 1,568,725 teaches the use of 4-amino-2,2,6,6-tetramethylpiperidine as a curing agent for epoxy resins. Epoxy resin films hardened with 4-amino-2,2,6,6-tetramethylpiperidine showed surprisingly good UV stability for epoxy resins.

U.S. Pat. No. 4,469,829 teaches the attachment of 4-amino-2,2,6,6-tetramethylpiperidine to 1,3-polybutadiene containing epoxy groups to obtain polymer bound hindered amine light stabilizers.

Japanese Patent JP 85 168 729 teaches the preparation of polymer bound UV absorbers by reacting epoxy resins and 4-amino benzoic acid. (CA 104 34970x).

U.S. Pat. No. 4,292,195 teaches the preparation of non-fugitive antioxidants by reacting secondary aromatic amines containing a pendant amino group with a polyepoxide. The reaction products are particularly useful as antioxidants for rubbers and plastics especially if the rubbers or plastics are subject to solvents which normally would extract a significant portion of conventional antioxidants.

J. Luston et. al. (J. Luston and Z. Manasek, J. Appl. Polymr. Sci., Vol. 21, 915-922 (1977) prepared nonvolatile UV absorbers by reacting epoxy resins with 2,4-dihydroxy-5-t-butylbenzophenone. The product was claimed to be useful in polypropylene fibers which are spun at 330° C.

U.S. Pat. No. 4,801,660 teaches the curing of epoxy resins with mercaptan-containing polyphenols. The compositions are particularly useful as adhesives and have good moisture resistance.

Ger. Offen 2,916,877 (EP 019,103) teaches the attachment of hindered phenol antioxidants containing carboxylic acid groups to glycidyl ethers and esters and cycloaliphatic epoxides and triglycidyl isocyanurate (Ca 94 85143m) to make migration resistant stabilizers for polyolefins.

U.S. Pat. No. 4,585,693 teaches the attachment of UV absorbers containing reactive functionality such as amine, hydroxyl or carboxylic acid groups to acrylate-glycidyl methacrylate copolymers by reaction with the pendant glycidyl group.

U.S. Pat. No. 4,544,691 teaches the modification of UV absorbers (oxanilides, benzalmalonates, α-cyanocinnamates and o-hydroxyphenylbenzotriazoles) containing phenolic hydroxyl groups with alkyl glycidyl ethers. The modified UV absorbers are less volatile, more compatible in coating formulations and have free hydroxyl groups that are capable of binding chemically with the coating components of acrylic and polyester enamels that are crosslinked with hydroxymethyl melamine and/or alkoxymethyl melamine curing agents.

U.S. Patent Application Ser. No. 310,425 filed Feb. 13, 1989, now U.S. Pat. No. 4,981,914 teaches the attachment of hydrazide functionalized benzotriazoles to polymers containing at least one ester, epoxide, or anhydride functional group in the polymer backbone, on grafted side chains or as a pendant unit.

In conclusion, the prior art teaches the curing of epoxy resins with carboxylic acid hydrazides and dihydrazides. It also teaches that it is advantageous to attach hindered amine light stabilizers and UV absorbers to epoxy resins and epoxides. The modified stabilizers are less volatile, more compatible with host polymers and less extractable with solvents. There are no references to my knowledge of attaching hydrazido functionalized hindered amine light stabilizers (or UV absorbers) to epoxy resins (exclusive of the acrylate/glycidyl methacrylate copolymers of U.S. Patent Application Ser. No. 275,452 filed Nov. 23, 1988 now U.S. Pat. No. 4,927,891) by reaction of the hydrazide group with the epoxy (glycidyl ether) group of the resin.

DEFINITIONS

In the specification and appended claims, reference to 2,2,6,6-tetraalkylpiperidines or 2,2,6,6-tetraalkyl-4-piperidinyl groups comprehends in addition the above groups optionally substituted in the 3-position of the piperidine group with lower alkyl groups of 1-4 carbons, i.e.

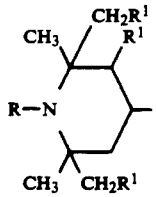

where R and $R^1$ are as defined on the preceding pages.

The term "acyl" comprehends a radical generated from a carboxylic acid by the removal of the OH group to provide a free valence on the C(=O) group, for example D—C(=O)—OH would become the D—C(=O) substituent referred to generally as a D acyl group.

Where any symbol appears more than once in a formula, its significances are independent of one another.

Epoxide index means the number of epoxide equivalents per 100 grams of epoxide compound or resin.

"Epoxy equivalent" is the weight in grams of polymer containing one mole of epoxy groups.

The term "curing" as employed throughout this specification and claims comprehends the conversion of the soluble, either liquid or fusible, epoxy resins into solid insoluble and infusible three-dimensional crosslinked products ("completion of curing") usually with concomitant shaping to shaped or molded articles such as castings, moldings and laminates, impregnations, as well as coatings, varnish films or bonding material.

By a "B-stage" resin is meant a partially reacted or cured product which will undergo little or no physical change at ambient room temperatures and in which the reactants are homogeneously compatible in a one component, stable compound ready for final curing at elevated temperatures.

"Partial cure" or "partially advanced cure" includes B-stage resin but also includes any stage of the curing reaction from the initiation of the reaction between the uncured resin and the components intended to participate with it in the cross linking reaction to a stage just prior to completion of curing as defined above.

One of skill in the art will be able to select any desired stage of cure using standard curing techniques and monitoring techniques well known in the art.

The equivalent weight of the HALS amic acid and of the benzotriazole hydrazide is the molecular weight of the hydrazide divided by the number of active hydrogen atoms, i.e. hydrogens bound to amino nitrogen. In Formula I when R and $R^5$ are hydrogen, there are 3 active hydrogens, R and $R^5$ being active hydrogens. In Formula II when R and $R^5$ are hydrogen, there are 6 active hydrogens, R and $R^5$ being active hydrogens.

SUMMARY OF THE INVENTION

The invention provides in a first composition aspect a curable compositon comprising A) one or more polyepoxides containing an average of at least 1.75 reactive 1,2-epoxy groups per molecule with the proviso that said polyepoxides do not include copolymers of glycidyl esters of acrylic or methacrylic acids, and B) a hydrazido functionalized hindered amine light stabilizer of Formula I or II or combinations thereof and optionally a hydrazido functionalized 2-(2-hydroxyphenyl)-2H-benzotriazole of Formula III

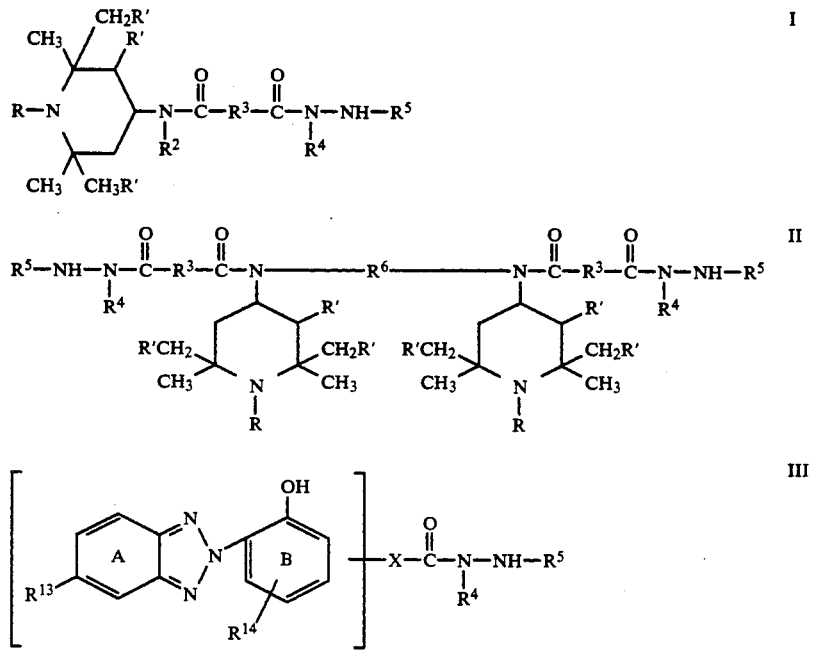

wherein:

R is hydrogen, oxyl, hydroxyl, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, $-[C(=O)-]_a-N(R^7)(R^8)$, $-[C(=O)]_a-O-R^9$, $-(CH_2)_a-C(=O)-O-R^{10}$ or $-CH_2-CH_2-[CH_2-CH(R^1)-O]_b-R^{11}$ where a is 1-2 and b is 2-50. Preferably R is hydrogen, substituted or unsubstituted aliphatic of 1-4 carbons, substituted or unsubstituted araliphatic of 7-10 carbons, substituted or unsubstituted aliphatic acyl of 2-6 carbons or substitued or unsubstituted benzoyl. Most preferably R is hydrogen, methyl, acetyl or benzoyl.

$R^1$ is hydrogen or aliphatic of 1-4 carbons. Preferably $R^1$ is hydrogen or methyl. Most preferably $R^1$ is hydrogen.

$R^2$ is hydrogen, substituted or unsubstituted aliphatic of 1-20 carbons, substituted or unsubstituted alicyclic of 5-12 carbons, substituted or unsubstituted aryl of 6-14 carbons, substituted or unsubstituted araliphatic of 7-22 carbons or 2-cyanoethyl. When alicyclic, $R^2$ may optionally contain $-N(R^{12})-$ as a ring member. Preferably $R^2$ is hydrogen, alkyl of 1-4 carbons or 2,2,6,6-tetramethyl-4-piperidinyl. Most preferably $R^2$ is hydrogen.

$R^3$ is a direct bond, substituted or unsubstituted aliphatic diradical of 6-20 carbons, substituted or unsubstituted alicyclic diradical of 5-12 carbons, and substituted or unsubstituted araliphatic diradical of 7-22 carbons. The diradicals may optionally contain 1-6 oxygen, sulfur and nitrogen heteroatoms with the proviso that multiple heteroatoms must be separated from each other and the diradical ends by at least one carbon atom. Preferably $R^3$ is a direct bond, substituted or unsubstituted alkylene diradical of 1–8 carbons or substituted or unsubstituted o-, m-, p-phenylene diradical. Most preferably $R^3$ is a direct bond or substituted or unsubstituted alkylene diradical of 1–7 carbons.

$R^2$ and $R^3$ may be linked together to form a 5-membered lactam ring.

$R^4$ is hydrogen, substituted or unsubstituted aliphatic of 1–20 carbons, substituted or unsubstituted araliphatic of 7–22 carbons or substituted or unsubstituted alicyclic of 5–12 carbons. Preferably $R^4$ is hydrogen.

$R^5$ is hydrogen, substituted or unsubstituted aliphatic of 1–20 carbons, substituted or unsubstituted alicyclic of 5–12 carbons or substituted or unsubstituted araliphatic of 7–22 carbons. Preferably $R^5$ is hydrogen, alkyl of 1–8 carbons, cyclohexyl or benzyl. Most preferably $R^5$ is hydrogen.

$R^6$ is a substituted or unsubstituted aliphatic diradical of 2–18 carbons, substituted or unsubstituted alicyclic diradical of 5–18 carbons, substituted or unsubstituted araliphatic diradical of 7–10 carbons, the aliphatic chains of which may optionally contain heteroatoms —O—, —S— and —N($R^{12}$)— with the proviso that multiple heteroatoms must be separated from each other and the diradical ends by at least two carbon atoms. Preferably $R^6$ is a substituted or unsubstituted aliphatic diradical of 2–12 carbons. Most preferably $R^6$ is an alkylene diradical of 2–10 carbons.

$R^7$ and $R^8$ are independently hydrogen, substituted or unsubstituted aliphatic of 1–20 carbons, substituted or unsubstituted aryl of 6–14 carbons, substituted or unsubstituted araliphatic of 7–22 carbons or substituted or unsubstituted alicyclic of 5–12 carbons which may optionally contain —N($R^{12}$)— as a ring member and optionally $R^7$ and $R^8$ may be linked together by a direct bond or through a heteroatom —N($R^{12}$)— or —O— to form a heterocyclic ring of 5–7 atoms. Preferably $R^7$ and $R^8$ are independently hydrogen, substituted or unsubstituted aliphatic of 1–8 carbons, substituted or unsubstituted phenyl or substituted or insubstituted benzyl. Most preferably $R^7$ is hydrogen, methyl or ethyl. Most preferably $R^8$ is substituted or unsubstituted aliphatic of 1–8 carbons, or substituted or unsubstituted phenyl.

$R^9$ is substituted or unsubstituted aliphatic of 1–20 carbons, substituted or unsubstituted alicyclic of 5–12 carbons, substituted or unsubstituted aryl of 6–14 carbons or substituted or unsubstituted araliphatic of 7–22 carbons. Preferably $R^9$ is substituted or unsubstituted aliphatic of 1–8 carbons, substituted or unsubstituted phenyl or substituted or unsubstituted benzyl.

$R^{10}$ is hydrogen, substituted or unsubstituted aliphatic of 1–20 carbons, substituted or unsubstituted alicyclic of 5–12 carbons, substituted or unsubstituted aryl of 6–14 carbons or substituted or unsubstituted araliphatic of 7–22 carbons. Preferably $R^{10}$ is hydrogen, substituted or unsubstituted aliphatic of 1–8 carbons, substituted or unsubstituted phenyl or substituted or unsubstituted benzyl.

$R^{11}$ is hydrogen or aliphatic of 1–4 carbons. Preferably $R^{11}$ is methyl, ethyl or isopropyl.

$R^{12}$ is hydrogen, substituted or unsubstituted aliphatic of 1–20 carbons, substituted or unsubstituted alicyclic of 5–12 carbons, substituted or unsubstituted araliphatic of 7–22 carbons, substituted or unsubstituted aliphatic acyl of 2–20 carbons, substituted or unsubstituted alicyclic acyl of 7–16 carbons, substituted or unsubstituted aryl acyl of 7–11 carbons, substituted or unsubstituted araliphatic acyl of 7–22 carbons, —(C(=O))$_a$—N($R^7$)($R^8$), —(C(=O))$_a$—OR$^9$, —(CH$_2$)$_a$—C(=O)—OR$^{10}$, where a is 1–2 or —(CH$_2$—CH($R^1$)—O)$_b$—R$^{11}$ where b is 2–50. Preferably $R^{12}$ is hydrogen, substituted or unsubstituted aliphatic of 1–4 carbons, substituted or unsubstituted araliphatic of 7–10 carbons, substituted or unsubstituted aliphatic acyl of 2–6 carbons or unsubstituted benzoyl. Most preferably $R^{12}$ is hydrogen, methyl, acetyl or benzoyl.

$R^{13}$ is hydrogen, chlorine, bromine, substituted or unsubstituted aliphatic of 1–8 carbons, substituted or unsubstituted alkoxy of 1–8 carbons, substituted or unsubstituted alkoxycarbonyl of 2–8 carbons, alkylaminocarbonyl of 2–5 carbons, dialkylaminocarbonyl of 3–9 carbons, substituted or unsubstituted N-(alkyl)-N-(aryl)aminocarbonyl of 8–15 carbons, alkoxysulfonyl of 1–4 carbons, —C(=O)—OH—, —C(=O)NH$_2$, —S(=O)$_2$—OH or X$_A$. Preferably, $R^{13}$ is hydrogen, substituted or unsubstituted aliphatic of 1–8 carbons, substituted or unsubstituted alkoxy of 1–8 carbons, methoxycarbonyl, ethoxycarbonyl, carboxy, chloro, S(=O)$_2$—OH or X$_A$. Most preferably, $R^{13}$ is hydrogen, alkyl of 1–4 carbons, methoxy, ethoxy, chloro, or carboxy.

$R^{14}$ is hydrogen, substituted or unsubstituted aliphatic of 1–8 carbons, substituted or unsubstituted aryl of 6–14 carbons, substituted or unsubstituted araliphatic of 7–22 carbons, substituted or unsubstituted alkoxy of 1–8 carbons, alkylaminocarbonyl of 2–5 carbons, dialkylaminocarbonyl of 3–9 carbons, or substituted or unsubstituted N-(alkyl)-N-(aryl)aminocarbonyl of 8–15 carbons or X$_A$. Preferably, $R^{14}$ is hydrogen, substituted or unsubstituted aliphatic of 1–8 carbons, substituted or unsubstituted araliphatic of 7–9 carbons or X$_B$. Most preferably, $R^{14}$ is methyl, ethyl, t-butyl, t-octyl, 2-methyl-2-phenylethyl.

X is X$_A$ when attached to ring A in Formula III, X$_B$ when attached to ring B in Formula III.

X$_A$ is a direct bond

X$_B$ is a divalent radical of formula

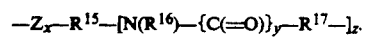

Z is —O—, N($R^{16}$)—, —S— or —S(=O)$_2$—, x, y and z are independently 0 or 1.

Preferably x is X$_B$ and X$_B$ is —Z$_x$—R$^{15}$—[N($R^{1-6}$)—{C(=O)}$_y$—R$^{17}$—]$_z$ where x is O and y and z are 1, or x, y and z are 0. Most preferably X$_B$ is R$^{15}$ i.e. x and z are O.

$R^{15}$ is a direct bond or substituted or unsubstituted alkylene diradical of 1–4 carbons. Preferably $R^{15}$ is a direct bond, methylene or 1,2-ethanediyl.

$R^{16}$ is hydrogen, substituted or unsubstituted aliphatic of 1–20 carbons, substituted or unsubstituted alicyclic of 5–12 carbons, substituted or unsubstituted aryl of 6–14 carbons, or substituted or unsubstituted araliphatic of 7–22 carbons. Preferably, $R^{16}$ is hydrogen, substituted or unsubstituted aliphatic of 1–12 carbons, substituted or unsubstituted alicyclic of 5–8 carbons, substituted or unsubstituted phenyl, or substituted or unsubstituted araliphatic of 7–9 carbons. Most preferably, $R^{16}$ is selected from hydrogen, substituted or unsubstituted aliphatic of 1–10 carbons, substituted or unsubstituted cyclohexyl, substituted or unsubstituted phenyl, or substituted or unsubstituted araliphatic of 7–14 carbons. $R^{16}$ independently is any of the groups of $R^9$.

$R^{17}$ is a direct bond, substituted or unsubstituted aliphatic diradical of 1–20 carbons, substituted or unsubstituted aryl diradical of 6–12 carbons, substituted or unsubstituted alicyclic diradical of 5–12 carbons, or substituted or unsubstituted araliphatic diradical of 7–22 carbons optionally containing 1–6 —O— —S— or —NH— heteroatoms with the proviso that multiple heteroatoms must be separated from each other and the diradical ends by at least one carbon atom. Preferably, $R^{17}$ is a direct bond, aliphatic diradical of 2–8 carbons, 1,3-phenylene diradical of 1,4-phenylene diradical. Most preferably, $R^{17}$ is a direct bond or alkylene diradical of 2–8 carbons.

Substituents for R, $R^2$, $R^3$, $R^4$, $R^5$, $R^6$, $R^7$, $R^8$, $R^9$, $R^{10}$, $R^{12}$, $R^{13}$, $R^{14}$, $R^{15}$, $R^{16}$ and $R^{17}$, are one of the following:

chloro, bromo, alkyl of 2–8 carbons, alkoxy of 1–12 carbons, phenoxy, cyano, hydroxy, epoxy, carboxy, benzoyl, benzoyloxy, dialkylamino of 2–8 carbons total, alkoxycarbonyl of 2–6 carbons, acyloxy of 1–4 carbons, acryloxyl, acryloyloxy, methacryloyl, methacryloyloxy, hydroxymethyl, hydroxyethyl, alkylthio of 1–4 carbons and trialkoxysilyl of 3–12 carbons.

The invention provides in a second composition aspect a cured or partially cured resin comprising the reaction products of the constituents of the first composition aspect of the invention.

The invention provides in a third composition aspect a cured or partially cured resin comprising the reaction products of the partially cured second composition aspect of the invention and an auxiliary curing agent.

The inherent applied use characteristics of the composition aspects of the invention may be described as follows:

Partially cured resins of this invention may be fully cured by the addition of supplemental hardening agents to provide light stabilized polymers or may be used as polymeric light stabilizers for other host polymers susceptible to the degradative effects of light. In some cases, the partially cured resin may react with the host polymer to give a network containing bound light stabilizing groups. Cured resins themselves are light stable entities capable of performing all the usual functions of cured epoxy resins.

If the concentration of a hydrazide functionalized light stabilizer of Formula I or II and optional Formula III attached to the resin is greater than 1% by weight, the resin may be used as a concentrate and may be let down with additional epoxy resins (either the same or different epoxy resin) before the final curing step. The concentration of the bound stabilizers of Formula I or II and optional Formula III should be between 0.1 and 5.0%, preferably between 0.30 and 2.5% in the final cured resin. In the event Formula III stabilizer groups are present they may be present at up to 90% by weight preferably up to 50% by weight of the total amount of stabilizer groups present.

The bound light stabilizers of this invention are very efficient in the stabilization of polymer systems which are subject to degradation upon exposure to heat or light. They are bound to the epoxy resin so they won't volatilize out of the system during prolonged heating cycles at high temperatures or leach out upon prolonged exposure to water or solvent. The bound stabilizers of Formula I or II of this invention contain both a hindered amine light stabilizing group and an amic acid hydrazide group. The amic acid hydrazide group enhances the photooxidative stabilizing properties of the hindered amine group and contributes thermooxidative stabilizing and metal complexing properties to the compounds. This is especially significant when $R^3$ is a direct bond in Formula I or II. This enhancement in stabilizing efficiency has been demonstrated for the Formula I and II compounds and various derivatives of them in U.S. Pat. Nos. 4,824,884; 4,863,999 and 4,857,595. Present invention disclosures U.S. patent application Ser. No. 310,408 filed Feb. 23, 1989 now U.S. Pat. No. 4,983,738; U.S. patent application Ser. No. 454,889 filed Dec. 22, 1989 now U.S. Pat. No. 5,043,372 and U.S. patent application Ser. No. 455,219 filed Dec. 22, 1989 now abandoned also demonstrate the enhanced efficiency of the N-HALS amic acid hydrazide functionality.

Thus, the invention provides cured or partially cured epoxy resins which are stabilized against the degradative effects of light, heat and oxygen by bound light stabilizers. The stabilizers are hindered amine light stabilizers containing both 2,2,6,6-tetraalkylpiperidinyl and amic acid hydrazide functionalities. Due to their attachment to the epoxy resins, the stabilizers are non-volatile and are not readily lost from the epoxy resin via exudability or extraction.

Further the invention provides partially cured epoxy resins containing the bound stabilizer groups which can be cured by auxiliary hardening agents to fully cured light stable epoxy resins.

A more preferred embodiment of the invention provides stabilized epoxy resins containing a 2,2,6,6-tetraalkylpiperidine stabilizer bound to the epoxy resin through an oxamic acid hydrazide functionality which enhances the photooxidative stabilizing properties of the hindered amine group and contributes thermooxidative stabilizing and metal complexing properties to the composition.

An even more preferred embodiment of the invention provides partially cured epoxy resins containing a combination of bound stabilizer groups where one stabilizer is a 2,2,6,6-tetraalkylpiperidine bound to the epoxy resin through an oxamic acid hydrazide functionality and the other stabilizer is a 2-(2-hydroxyphenyl)-2H-benzotriazole bound to the epoxy resin through an acid hydrazide functionality.

GENERAL GROUP EXAMPLES

Specific, non-limiting examples of particular constituent groups are as follows:

As a substituted or unsubstituted aliphatic of 1–20 carbons, R, $R^2$, $R^4$, $R^5$, $R^7$, $R^8$, $R^9$, $R^{10}$, $R^{12}$, $R^{13}$ and $R^{16}$ may be, for example, methyl, ethyl, n-propyl, isopropyl, allyl, hexyl, heptyl, octyl, nonyl, decyl, propargyl, octadecyl, dodecyl, isododecyl, tetradecyl, 2-methallyl, 2-hexenyl, 10-undecenyl, 2-dodecenyl, n-butyl, 2-hydroxyethyl, 2-butenyl, 2-hydroxypropyl, cyanomethyl, 2,3-epoxypropyl, dimethylaminoethyl, 2-hydroxy-e-phenoxypropyl, 2-hydroxy-3-(2-ethylhexoxy)propyl or 2-hydroxyoctyl.

As a substituted or unsubstituted alicyclic of 5–12 carbons, R, $R^2$, $R^4$, $R^5$, $R^7$, $R^8$, $R^9$, $R^{10}$, $R^{12}$ and $R^{16}$ may be, for example, cyclohexyl, trimethylcyclohexyl, cyclooctyl, cyclododecyl, 4-t-butylcyclohexyl, 3-cyclohexenyl, cyclododecyl, 4-octylcyclohexyl or 2-methyl-4-octylcyclohexy.

As substituted or unsubstituted aryl of 6–14 carbons, $R^2$, $R^7$, $R^8$, $R^9$, $R^{10}$, $R^{14}$ and $R^{16}$ may be, for example, phenyl, tolyl, 4-chlorophenyl, isopropylphenyl, anisyl, 3,5-di-t-butyl-4-hydroxyphenyl, naphthyl, 3-methyl-5-t-butyl-4-hydroxyphenyl, 3,4,5-trimethoxyphenyl, or 4-dimethylaminophenyl.

As a substituted or unsubstituted araliphatic group of 7-22 carbons, R, $R^2$, $R^4$, $R^5$, $R^7$, $R^8$, $R^9$, $R^{10}$, $R^{12}$, $R^{14}$ and $R^{16}$ may be, for example, benzyl, 3-methylbenzyl, 4-t-butylbenzyl, cinnamyl, 3,5-di-t-butyl-4-hydroxybenzyl, 2-phenylethyl, cumyl, trimethylbenzyl, 4-octyloxybenzyl, naphthylmethyl or (4-dodecylphenyl)methyl.

As a substituted or unsubstituted aliphatic acyl of 2-20 carbons, substituted or unsubstituted alicyclic acyl of 7-16 carbons, substituted or unsubstituted aryl acyl of 7-11 carbons or substituted or unsubstituted araliphatic acyl of 7-22 carbons, R and $R^{12}$ may be, for example, formyl, acetyl, chloroacetyl, acryloyl, methacryloyl, propionyl, butyryl, 2-methylpropionyl, capryl, capryloyl, lauroyl, crotonoyl, stearoyl, cyclohexylcarbonyl, 4-t-butylcyclohexylcarbonyl, 3-cyclohexenyl-1-carbonyl, cyclododecylcarbonyl, 4-octylcyclohexylcarbonyl, 2-ethoxy-2-oxoacetyl, 2-methoxy-2-oxoacetyl, 2-methyl-4-octylcyclohexylcarbonyl, benzoyl, toluoyl, 4-chlorobenzoyl, isopropylbenzoyl, anisoyl, 3,5-di-t-butyl-4-hydroxybenzoyl, naphthoyl, 3-methyl-5-t-butyl-4-hydroxybenzoyl, 3,4,5-trimethoxybenzoyl, 4-dimethylaminobenzoyl, 3-(3,5-di-t-butyl-t-hydroxyphenyl)propionyl, cinnamoyl or dihydrocinnamoyl. R is preferably alkanoyl of 2-5 carbons, cyclohexylcarbonyl, benzoyl or phenacyl.

As —[C(=O)]$_a$—N($R^7$)($R^8$), R and $R^{12}$ may be, for example, N-methylcarbamoyl, N-(n-butyl)carbamoyl, N-dodecylcarbamoyl, N,N-dimethylcarbamoyl, N,N-diethylcarbamoyl, N,N-di(n-hexyl)carbamoyl, piperidin-1-ylcarbonyl, 2,2,6,6-tetramethyl-4-piperidinylcarbonyl, piperazine-1-carbonyl, 4-methylpiperazine-1-carbonyl, morpholin-2-carbonyl, 2-(dibutylamino)-2-oxoacetyl, 2-(phenylamino)-2-oxoacetyl, N-phenylcarbamoyl, N-(4-butylphenyl)carbamoyl, N-(alpha-naphthyl)-carbamoyl, N-phenyl-N-hexylcarbamoyl, N-(trimethylphenyl)-N-amylcarbamoyl, N,N-diphenylcarbamoyl, N,N-di(4-methylphenyl)carbamoyl or N-(4-benzylaminophenyl)-N-phenylcarbamoyl.

As —[C(=O)]$_a$—O—$R^9$, R and $R^{12}$ may be, for example, methoxycarbonyl, 2-ethoxy-2-oxoacetyl, 2-methoxy-2-oxoacetyl, 2-cyclohexyloxy-2-oxoacetyl, ethoxycarbonyl, phenoxycarbonyl, (2-methylphenoxy)carbonyl, allyloxycarbonyl, cyclododecyloxycarbonyl, 2-ethylhexoxycarbonyl, ethoxycarbonyl, isopropoxycarbonyl or (4-octyloxyphenyl)carbonyl.

As —(CH$_2$)$_a$—C(=O)—O—$R^{10}$, R and $R^{12}$ may be, for example, ethoxycarbonylmethyl, methoxycarbonylmethyl, methoxycarbonylethyl, butoxycarbonylmethyl, (benzyloxy)carbonylmethyl or (benzyloxy)carbonylethyl.

As —CH$_2$—CH$_2$—[CH$_2$—CH($R^1$)—O]$_b$—$R^{11}$, R and $R^{12}$ may be for example, butoxypoly(propoxy)ethyl, hydroxypoly(ethoxy)ethyl or 2-[hydroxypoly(propoxy)]-2-methylethyl.

As an aliphatic group of 1-4 carbons, $R^1$ and $R^{11}$ may be, for example, methyl, ethyl, propyl, isopropyl, allyl, n-butyl, sec-butyl or isobutyl.

As a substituted or unsubstituted aliphatic diradical of 1-20 carbons, a substituted or unsubstituted aryl diradical of 6-12 carbons, a substituted or unsubstituted alicyclic diradical of 5-12 carbons or a substituted or unsubstituted araliphatic diradical of 7-22 carbons optionally containing 1-6 —O—, —S— or —NH— heteroatoms, $R^3$ and $R^{17}$ may be, for example, methylene, ethane-1,2-diyl, ethene-1,2-diyl, propane-1,3-diyl, propene-1,2-diyl, 2-thiopropene-1,3-diyl, 2-oxapropane-1,3-diyl, hexane-1,3-diyl, 2-azapropane-1,3-diyl, 2-methyl-2-azapropane-2,3-diyl, cyclohexane-1,2-diyl, 1,2-phenylene, 1,3-phenylene, 1,4-phenylene, hexane-1,6-diyl, octane-1,8-diyl, decane-1,10-diyl, dodecane-1,12-diyl, 3-hexan-1,6-diyl, 4-methyl-1,2-phenylene, 4-chloro-1,2-phenylene, 4-methylcyclohexane-1,2-diyl, cyclohexane-1,2-diyl, 4-methyl-4-cyclohexane-1,2-diyl, toluene-alpha,2-diyl,toluene-alpha,4-diyl or toluene-alpha,3-diyl.

When $R^2$ and $R^3$ are linked together to form a 5-membered lactam ring, $R^2$ and $R^3$ together with the nitrogen atom to which they are attached may form, for example, a 1-aza-2-oxocyclopentane-1,4-diyl diradical.

As substituted or unsubstituted aliphatic of 1-8 carbons, $R^{13}$ and $R^{14}$ may be, for example, methyl, hexyl, heptyl, octyl, 2-methallyl, isobutyl, 2-hydroxyethyl, 2-acetoxyethyl or t-octyl.

As substituted or unsubstituted alkoxy of 1-8 carbons, $R^{13}$ and $R^{14}$ are, independently, for example, methoxy, ethoxy, 2-ethylhexyloxy, isopropoxy, 2-hydroxypropoxy, 2-(acyloyloxy)ethoxy, or sec-butoxy.

As substituted or unsubstituted alkoxycarbonyl of 2-8 carbons, $R^{13}$ may be, for example, methoxycarbonyl, ethoxycarbonyl, 2-hydroxyethylcarbonyl, allyloxycarbonyl, or butoxycarbonyl.

As alkylaminocarbonyl of 2-5 carbons, dialkylaminocarbonyl of 3-9 carbons and substituted or unsubstituted N-(aryl)-N-(alkyl)aminocarbonyl of 8-15 carbons, $R^{13}$ and $R^{14}$ are, independently, for example, methylaminocarbonyl, ethylaminocarbonyl, butylaminocarbonyl, N-(4-methylphenyl)-N-methylaminocarbonyl, N-phenyl-N-methylaminocarbonyl, N-(2-ethoxyphenyl)-N-ethylaminocarbonyl, N-(3-isopropenylphenyl)-N-butylaminocarbonyl, dimethylaminocarbonyl, or dibutylaminocarbonyl.

As alkoxysulfonyl of 1-4 carbons, $R^{13}$ is, for example, methoxysulfonyl, or butoxysulfonyl.

As substituted or unsubstituted alkylene diradical of 1-4 carbons, $R^{15}$ is, for example, methylene, 1,2-ethanediyl, 1,1-ethanediyl, 2-hydroxy-1,3-propanediyl, 1,2-propanediyl, 1,3-propanediyl, 2-methoxy-1,3-propanediyl, 1,2-butanediyl, 1,3-butanediyl, or 1,4-butanediyl.

As substituted or unsubstituted aliphatic diradical of 2-18 carbons, substituted or unsubstituted alicyclic diradical of 5-18 carbons and substituted or unsubstituted araliphatic diradical of 7-22 carbons, $R^6$ is, for example, 1,2-ethanediyl, 1,2-propanediyl,1,3-propanediyl, 1,4-butanediyl, 1,18-octadecanediyl, 2,2-dimethyl-1,3-propanediyl, 2-methylpentane-2,4-diyl, 1,10-decanediyl, 1,12-dodecanediyl, 3-oxapentane-1,5-diyl, 4-oxaheptane-1,7-diyl, 3,6-dioxaoctane-1,8-diyl, 4,9-dioxadodecane-1,12-diyl, 4-methyl-4-azaheptane-1,4-diyl, 3,6-diaza-3,6-dimethyl-1,8-octanediyl, 3-methyl-3-azapentane-1,5-diyl, 1,2-cyclohexanediyl, 1,4-cyclohexanediyl, 1,2-ethenediyl, 1,2-propenediyl, 4-methyl-4-cyclohexene-1,2-diyl, 4-cyclohexene-1,2-diyl, 4-methylcyclohexane-1,2-diyl, 3-oxapentane-1,5-diyl, methylenebis(4-cyclohexy)-1,2-diyl, 4-methylcyclohexane-1,2-diyl, 3-oxapentane-1,5-diyl, methylenebis(4-cyclohexyl).

The invention also provides in a fourth composition aspect a cured light stabilized resin comprising light stabilizer constituents selected from the group consisting of the second composition aspect of the invention, the third composition aspect of the invention or mixtures thereof.

The invention also provides in a first process aspect a process for preparing a cured light stabilized epoxy resin comprising heating a curable composition as defined in the first composition aspect of the invention exclusive of copolymers of glycidyl esters of acrylic or methacrylic acids, and B) a hydrazide functionalized hindered amine light stabilizer of Formula I or II or combinations thereof and optionally a hydrazide functionalized 2-(2-hydroxyphenyl)-2H-benzotriazole of Formula III.

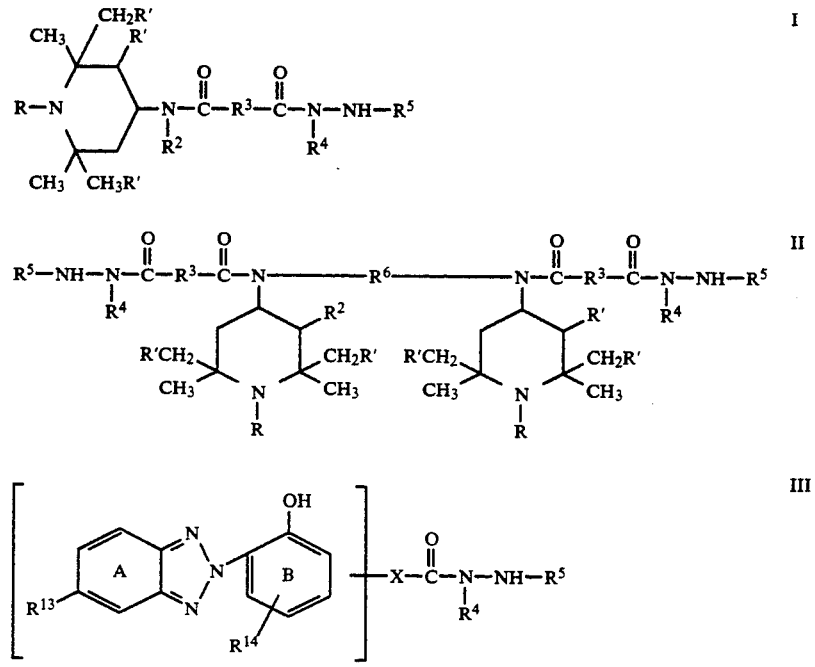

wherein the hindered amine compound and optionally the benzotriazole compound are present at from about 0.70 to about 1.30 equivalents per epoxy equivalent at about 100° C. to about 200° C. for a period of time sufficient to reach the desired stage of cure.

The invention provides in a second process aspect, a process for preparing a light stabilized epoxy resin which comprises:
A) Heating a curable composition as defined in the first composition aspect of the invention wherein the hindered amine compound and optionally, the benzotriazole compound are present at from about 0.02 to about 0.2 equivalents per epoxy equivalent at about 100° to about 200° C. for a period of time to partially advance curing the composition,
B) Cooling the partially cured composition from step A to below about 100° C.,
C) Combining with the cooled composition of step B from about 0.7 to about 4.0 active hydrogen equivalents per epoxy equivalent of an auxiliary curing agent, and
D) Heating the mixture prepared in step C from about 100° C. to about 250° C. for a period of time sufficient to provide the desired degree of cure.

DETAILED DESCRIPTION OF THE INVENTION

The novel compositions of this invention are curable compositions comprising:
A) one or more polyepoxides containing an average of at least 1.75 reactive 1,2-epoxy groups per molecule wherein R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, and X are as previously defined, the cured or partially cured initial reaction products thereof, or the cured or partially cured reaction products of the reaction of said partially cured initial reaction products and an auxiliary curing agent.

EPOXY RESINS

Suitable epoxy resins include any curable epoxy resin having, on the average, at least 1.75 reactive vicinal epoxide groups per molecule exclusive of the copolymers of glycidyl esters of acrylic or methacrylic acid. The epoxy resin may be saturated or unsaturated, aliphatic, cycloaliphatic, aromatic or heterocyclic and may contain substituents which do not materially interfere with the curing reaction such as bromine, chlorine, cyano, ether, ester and amide groups.

Examples of suitable epoxy resins are described in the Kirk-Othmer Encyclopedia of Chemical Technology, Third Edition, Volume 9 pp 267–290 and Encyclopedia of Polymer Science, Second Edition, Vol. 6, pp 322–382, John Wiley & Son, N.Y., N.Y. Examples of suitable epoxy resins include:
a) diglycidyl or polyglycidyl ethers of polyhydric phenols, such as the diglycidyl ethers of 2,2-bis(p-hydroxyphenyl)propane (bisphenol A), bis-(p-hydroxyphenyl)methane (bisphenol F), 2,2-bis-(4'-hydroxy-3',5'-dibromophenyl)propane or resorcinol,
b) diglycidyl ethers of the so-called advanced dihydric phenols represented by the general formula

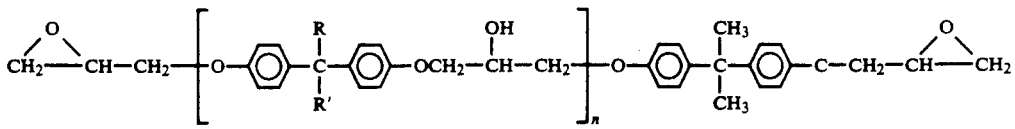

such as the diglycidyl ether of advanced bisphenol A (i.e. $R=R'=CH_3$)

c) diglycidyl or polyglycidyl ethers of condensation products of phenol or alkylphenols with formaldehyde such as the polyglycidyl ethers of phenol novolaks and cresol novolaks which may be represented by

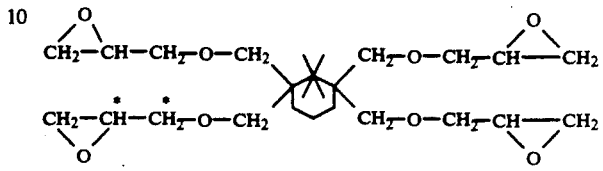

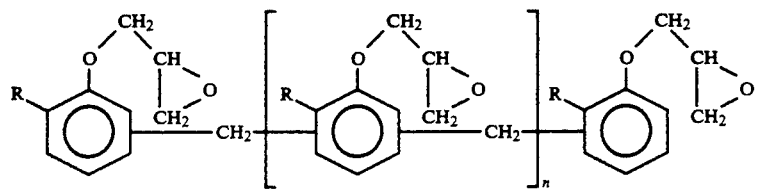

where $R=H$ or $CH_3$ d) diglycidyl and polyglycidyl ethers of polyhydric aliphatic alcohols such as 1,4-butanediol, neopentyl glycol and 1,3-propanediol or of polyalkylene glycols such as polyethylene or polypropylene glycols e) diglycidyl or polyglycidyl ethers of cycloaliphatic polyols such as 2,2-bis-(4-hydroxycyclohexyl)propane, bis-(4hydroxycyclohexyl)methane or 1,4-bis-(hydroxymethyl)cyclohexane.

f) cycloaliphatic diepoxides or polyepoxides such as those described in U.S. Pat. No. 3,027,357 and canadian Patent 1,243,147, suitable examples include 3',4'-epoxycyclohexylmethyl 3,4-epoxycyclohexylcarboxylate and bis-(3,4-epoxycyclohexylmethyl)sebacate g) diglycidyl and/or polyglycidyl esters of polybasic carboxylic acids such as phthalic, isophthalic, terephthalic, $\Delta^4$-tetrahydrophthalic, hexahydrophthalic, trimelletic, pyromellitic, oxalic, malonic, succinic, adipic, sebacic, fumaric and maleic acids.

h) N-glycidyl derivatives of amines, amides and heterocyclic nitrogen bases such as N,N-diglycidylaniline, N,N-diglycidyltoluidine, N,N,N',N'-tetraglycidyl-bis-(p-aminophenyl)methane, diglycidyl derivatives of hydantoins having the general structure.

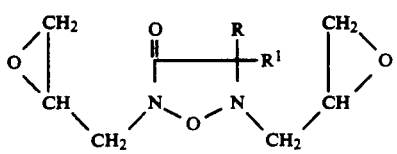

$R=H$ or lower alkyl
$R'=$ lower alkyl i) the 2,3-epoxypropionamide-glycidamide melamine resin solutions sold by Monsanto e.g. LSE 4107(TM)

j) cycloaliphatic epoxy resins of general structure

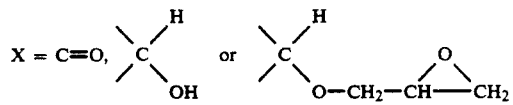

(see M. Agostinko, "Going Against Tradition: A New Family of Epoxy Resins which are Weatherable and Reactive at Ambient Temperatures, presented at the Water-Borne and Higher-Solids Coatings Symposium, Feb. 1-3, 1989, New Orleans, LA)

In addition mixtures of the above pure epoxy resins may also be employed. It is preferable to employ mixtures of diglycidyl ethers of the so-called advanced dihydric phenols e.g. the advanced epoxy resins of 2,2-bis-(4-hydroxyphenyl)propane, 2,2-bis-(3,5-dibromo-4-hydroxypenhyl)propane, bis-(4-hydroxyphenyl)methane, bis-(4-hydroxy-cyclohexyl)methane and 2,2-bis-(4-hydroxycyclohexyl)propane.

Epoxy resins particularly useful as component A in this invention have molecular weights generally in the range of 100 to about 10,000, preferably about 200 to about 1500. The commercially available Epon ® resins from Shell Chemical Company and the Tactix ® resins from Dow Chemical Company are particularly useful in the practice of the invention. Both resin series are reaction products of epichlorohydrin and bisphenols.

PREPARATION OF THE HALS AMIC ACID HYDRAZIDES

The preparation of the N-(2,2,6,6-tetraalkyl-4-piperidinyl)amic acid hydrazide starting materials of Formula I (where $R^2$ and $R^3$ are not linked together) are disclosed in copending U.S. Pat. No. 4,983,738, the disclosure of which is incorporated herein by reference.

The compounds of Formula I where $R^2$ and $R^3$ are linked together to form a 5-membered cyclic lactam may be prepared by reacting 4-amino-2,2,6,6-tetraalkyl-piperidines with dialkyl itaconates to form an intermediate 4-(alkoxycarbonyl)-1-(2,2,6,6-tetraalkyl-4-piperidinyl)-2-pyrrolidone according to the procedure described in U.S. Pat. No. 4,309,546, the disclosure of which is hereby incorporated herein by reference. The 4-alkoxycarbonyl group can then be converted to a hydrazide group by hydrazinoloysis with excess hydrazine hydrate in methanol, using standard reaction conditions.

The preparation of the N,N'-hydrocarbylenebis[N-(2,2,6,6-tetraalkyl-4-piperidinyl)amic acid hydrazides] of Formula II are disclosed in U.S. patent application Ser. No. 454,889 filed Dec. 22, 1989 now U.S. Pat. No. 5,043,372. They are prepared by the hydrazinolysis of the lower alkyl diesters of the corresponding N,N'-hydrocarbylenebis-[N-(2,2,6,6-tetraalkyl-4-piperidinyl)amic acids] with hydrazine, hydrazine hydrate or monosubstituted alkyl, cycloalkyl or aralkylhydrazines.

METHOD OF ATTACHMENT OF THE HALS AMIC ACID HYDRAZIDES

The epoxy resins are mixed with the HALS amic acid hydrazides of Formula I and/or II and heated to 100°–200° C., preferably 100°–165° C., for ½ to 5 hours to effectively attach the hydrazides to the epoxy resins. The higher the reaction temperature the shorter the required reaction time. Normally 1–2 hours reaction at 120°–140° C. is sufficient to completely react the hydrazides with the epoxy groups of the resins. The terminal amino groups of the hydrazides react analogously to alkylamino groups. Reaction does occur below 100° C. but it is too slow to be practical unless the reaction is catalyzed. Reaction also occurs above 200° C. but side reactions and discoloration may occur at the higher temperatures.

The terminal nitrogen of the hydrazide groups react with an epoxy group to bind the HALS amic acid hydrazide to the epoxy resin. If R5 is hydrogen in Formulas I and II, the hydrazide groups will react with 2 epoxy groups and if the R substituent on the hindered amine is also hydrogen, the hindered amine may also react with an epoxy group of the epoxy resin. The reaction is illustrated by the following equations where R and R5 are hydrogen,

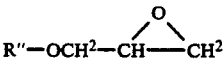

is the epoxy resin, R" is the remainder of the epoxy resin and contains at least one additional epoxy group and the reaction is carried out in an excess of

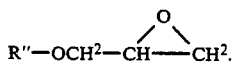

The reactions illustrate the complete alkylation of the active hydrogen sites of the HALS amic acid hydrazides of Formula I and II by an epoxy group of the epoxy resin.

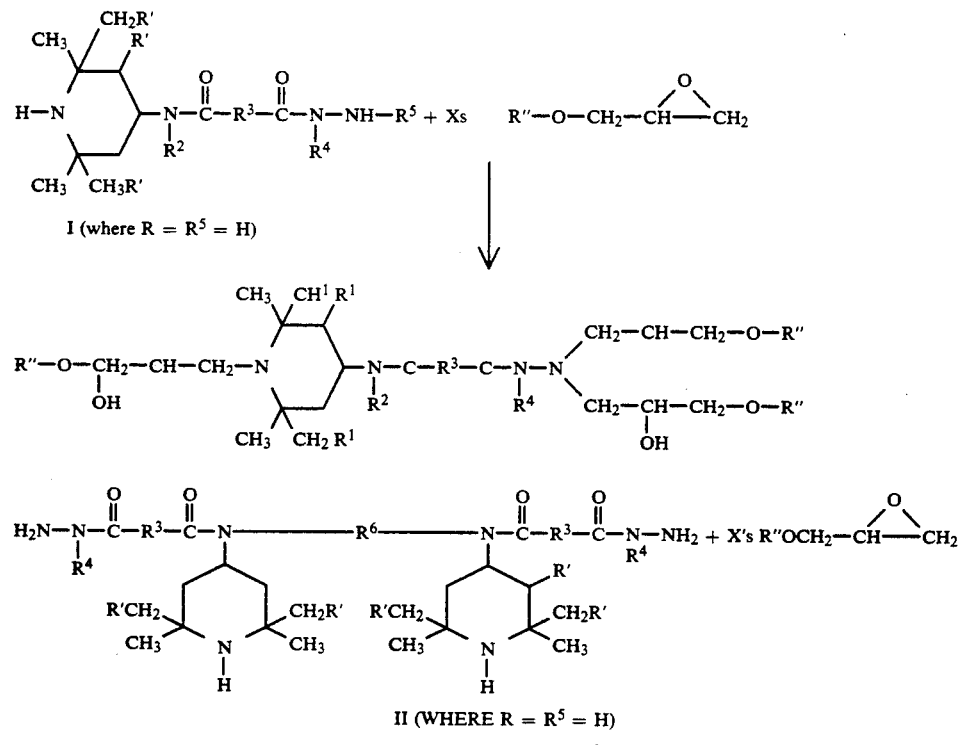

-continued

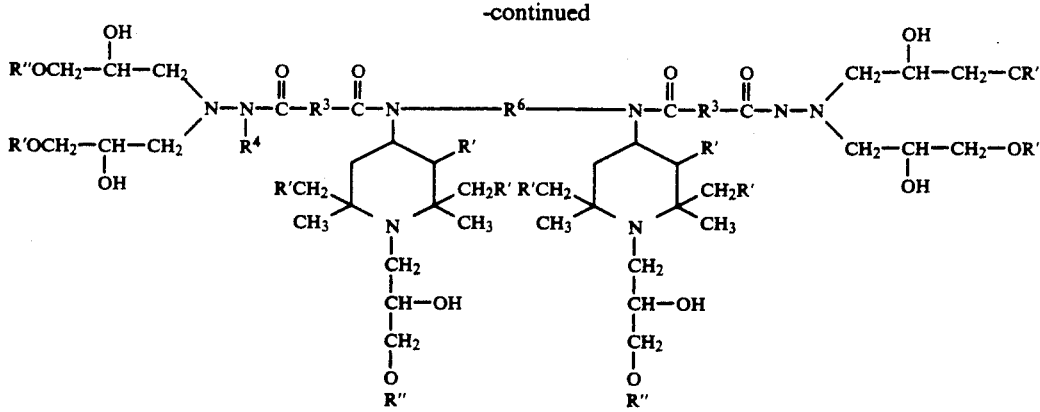

It will be obvious to one skilled in the art that depending upon the ratio of equivalents of the epoxy resin to the HALS amic acid hydrazide, the reaction temperature and duration of reaction that various intermediate products may also be present where alkylation of the active hydrogen sites of the nitrogens did not occur completely. Oligomers and crosslinked products may also form where the epoxy group of R" reacts with an active hydrogen of a partially reacted HALS amic acid hydrazide. Crosslinking becomes more predominant as the ratio of the epoxide equivalents to hydrazide equivalents decreases. Fully crosslinked networks form when the ratio of epoxy equivalents to hydrazide equivalents approaches 0.9-1.0.

Generally it is not economically practical to cure the resins completely with the HALS amic acid hydrazides. It is more practical to partially cure the epoxy resins with a sufficient amount of the HALS amic hydrazide to provide adequate heat and light stability and then complete the cure with an auxiliary hardening agent.

To be effectively light stabilized, the final completely cured epoxy resin composition should contain 0.1-5.0%, preferably 0.3-2.5% by weight of the bound HALS amic acid hydrazide. These concentrations also provide heat stability to the compositions.

Preferably, the curing reaction may be carried out in two or more steps. The first step is the attachment of the HALS amic acid hydrazide to the epoxy resin. However, the cure is not completed in this step. The resin can then be mixed with additional hardener and optionally other additives such as accelerators, extenders, fillers, reinforcing agents, pigments, dyes, plasticizers, flow control agents, thixotropic agents, flexibilizers, flame retardants, UV-absorbers, antioxidants, mold release agents and even monoepoxides. The β-stage resins can then be used for producing "prepregs", molding powders, laminates, coatings or castings before effecting the final cure at elevated temperatures. Normally the final cure is carried out in a heated oven at temperatures of 100°-250° C. for a sufficient time to effect a hard cure. The temperature and time will be dependent upon the reactivity of the auxiliary hardening agent.

The required amount of curing agent to obtain a fully cured resin is determined by the number of active hydrogen atoms in the curing agent(s) employed and the number of epoxy groups in the poxy resin(s). Generally, the number of equivalents of reactive curative groups is from about 0.7 to 1.3 times the number of epoxide equivalents present in the curable epoxy resin composition. Preferably, the equivalents (based on active hydrogens) of HALS amic acid hydrazide and auxiliary hardening agent be in the range of 0.8-1.2 times the equivalents of available epoxy groups. For example, 2 equivalents of polyepoxide could be reacted with 0.2 equivalents of a HALs amic acid hydrazide of Formula I and the cured with 2-8 equivalents of a primary aliphatic diamine such as Jeffamine D-400 (see below) in a subsequent step.

This curing reaction may be carried out using similar temperature ranges to those employed when attaching the hydrazide compounds to the resin or using those compounds as the sole curing agent. In some cases, however, temperatures up to 250° C. may be appropriate.

Auxiliary curing agents which may be used to cure the light stabilized partially cured epoxy resins of this invention include primary and secondary aliphatic and cycloaliphatic polyamines, aromatic polyamines, polyoxyalkylenepolyamines, polyamide amines, polyamides, dihydrazides, dicyandiamide, cyclic anhydrides and polymercaptans. (See Encyclopedia of Polymer Science, Second Edition, Vol. 6, pp 322-382, John Wiley & Sons, N.Y., N.Y. 1987).

Examples of suitable polyamines include diethylenetriamine, triethylenetetramine, isophorone diamine, 1,2-diaminocyclohexane, N-aminoethylpiperazine, 4,4-diaminodiphenylmethane, 4,4'diaminodiphenyl sulfone, m-phenylenediamine and p-phenylenediamine. Examples of polyoxyalkylenepolyamines include polyoxypropylenediamine having a molecular weight of about 230 to 400 and a polyoxypropylenetriamine having a molecular weight of about 400. These products are available under the tradename Jeffamine D-230, Jeffamine D-400 and Jeffamine T-403 from Texaco Chemical Co. Their use as curing agents is described in U.S. Pat. No. 4,189,564. Examples of suitable dihydrazides include carbohydrazide, biscyanoethyl carbodihydrazide, phthalic, isophthalic, oxalic, azelaic, succinic, adipic and sebacic dihydrazides (See U.S. Pat. No. 2,847,395).

Cyclic anhydrides of carboxylic acids are very good auxiliary curing agents for the compositions of this invention but the cyclic anhydrides must be added to the resin composition after it has been partially cured by the HALS amic acid hydrazide or else the HALS amic acid hydrazide will preferentially react with the cyclic anhydride instead of the epoxy resin. Examples of suitable anhydrides include phthalic, maleic tetrahydrophthalic, $\Delta^4$-methyl-tetrahydrophthalic, hexahydrophthalic, nadic methyl, chlorendic and pyromellitic anhydrides.

Shell Chemical Company sells a series of polyamide and amidoamine curing agents suitable as auxiliary curing agents, namely Epon ® Curing Agents F-5, V-15, V-25, V-40 and V-50.

Examples of suitable accelerators which speed up the curing reaction include C-17 alkylimidazoles such as 2-methyl and 2-heptadecylimidazole, arylimidazoles such as 2-phenylimidazole, t-amines such as N,N dimethylbenzylamine and 2,4,6-tris(dimethylaminomethyl)-phenol, quaternary ammonium salts and N,N-dimethyl-N'-3,4-dichlorophenyl urea.

Typical examples of extenders, reinforcing agents and fillers which may be present in the curable compositions and the partially or completely cured resin compositions of this invention include textile fibers, glass fibers, asbestos fibers, carbon fibers, cellulose, polyesters, polyamides, polyethylene powder, polypropylene powder, wood powder, quartz powder, mineral silicates such as mica, asbestos powder, slate powder, kaolin and metal powders such as aluminum or iron powder.

Typical examples of pigments which may be present in the compositions include titanium dioxide, carbon black and metal oxides such as iron oxide. Suitable plasticizers include dibutyl, dioctyl and dinonyl phthalates, and tricresyl and trixylenyl phosphates.

Examples of suitable flow control agents include silicones, liquid acrylic resins, cellulose acetobutyrate, polyvinylbutyrate, waxes or stearates.

Examples of suitable flexibilizers include oligoester segments, polyesters, thermoplasts and butadiene/acrylonitrile oligomers such as Hycar ® (a product of Goodrich).

Examples of suitable mono-epoxides include mono-unsaturated hydrocarbons such as butylene oxide, cyclohexene oxide and styrene oxide, glycidyl ethers of monohydric alcohols such as glycidyl 2-ethylhexyl ether and glycidyl dodecyl ether, glycidyl ethers of carboxylic acids such as glycidyl hexanoate and epoxidized esters of unsaturated alcohols and acids.

Examples of suitable antioxidants include phosphites and phosphonites, alkylated monophenols, alkylated hydroquinones, hydroxylated thiodiphenyl ethers, alkylidene-bisphenols, hindered phenolic benzyl compounds, acylamino phenols, esters of 3-(3,5-di-t-butyl-4-hydroxyphenyl)propionic acid, esters of 3-(5-t-butyl-4-hydroxy-3-methylphenyl)propionic acid and 3-(3,5-di-t-butyl-4-hydroxyphenyl)propionic acid amides.

Examples of suitable UV absorbers include 2-(2'hydroxyphenyl)-2H-benzotriazoles, 2-hydroxybenzophenones, benzylidene malonate esters, esters of substituted or unsubstituted benzoic acids, diphenyl acrylates, nickel chelates and oxalic acid diamides.

Optionally hydrazide functionalized 2-(2-hydroxyphenyl)-2H-benzotriazoles may be attached to the epoxy resin in the same manner as the HALS amic acid hydrazides, either before, after or simultaneously with the attachment of the HALS amic acid hydrazide. Normally the inclusion of the 2-(2-hydroxyphenyl)-2H-benzotriazole of Formula III provides a synergistic light stabilizing effect and less HALS amic acid hydrazide is required. The synthesis of the Formula III hydrazide is described in U.S. patent application Ser. No. 310,425 filed Feb. 13, 1989 now U.S. Pat. No. 4,980,420.

UTILITY

The epoxy resins of this invention containing bound light stabilizing groups are stabilized against the degradative effects of heat and light. Since the stabilizers are bound to the epoxy resin they will not be lost from the polymer system by volatilization, migration or extraction even when subjected to high temperatures for prolonged period so of time.

The polymers of this invention can be used by themselves as stabilized compositions or they may be blended with other polymers to form stabilized blends. Concentrates of the bound stabilizer of this invention in other polymers can be used as masterbatches to stabilize other polymer systems. The amount of concentrate required will depend on the concentration of the bound hindered amine light stabilizer, additional additives present, the particular polymer system to be stabilized and the degree of stabilization required. In general, it is advisable to have about 0.01 to 5% by weight of the bound hindered amine light stabilizer, preferably 0.1% to 1%, in the final polymer composition.

Although the bound stabilizers of this invention are most effective in stabilizing epoxy resins and especially epoxy resin coatings, they may also be used as stabilizers for synthetic polymers or copolymers which are subject to the degradative effects of heat and light. Such polymers and copolymers include:

1. Polyolefins such as high, low and linear low density polyethylenes, which may be optionally crosslinked, polypropylene, polyisobutylene, poly(methylbutene-1), polyacetylene and in general polyolefins derived from monomers having from two to about ten carbon atoms and mixtures thereof.

2. Polyolefins derived from diolefins such as polybutadiene and polyisoprene.

3. Copolymers of mono or diolefins such as ethylene-propylene, propylene-butene-1, propyleneisobutylene and ethylene-butene-1 copolymer.

4. Terpolymers of ethylene and propylene with dienes (EPDM) such as butadiene, hexadiene, dicyclopentadiene and ethylidene norbornene.

5. Copolymers of alpha-olefins with acrylic acid or methacrylic acids or their derivatives such as ethylene-acrylic acid, ethylene-methacrylic acid and ethylene-ethyl acrylate copolymers.

6. Styrenic polymers such as polystyrene (PS) and poly(p-methylstyrene).

7. Styrenic copolymers and terpolymers such as styrene-butadiene (SBR), styrene-allyl alcohol and styrene-acrylonitrile (SAN), styrene-acrylonitrile-methacrylate terpolymer, styrene-butadiene-styrene block copolymers (SBS), rubber modified styrenics such as styrene-acrylonitrile copolymers modified with acrylic ester polymer (ASA), graft copolymers of styrene on rubbers such as polybutadiene (HIPS), polyisoprene or styrene-butadiene-styrene block copolymers (Stereon TM products available from Firestone Synthetic Rubber and Latex Co.), graft copolymers of styrene-acrylonitrile on rubbers such as butadiene (ABS), polyisoprene or styrene-butadiene-styrene block copolymers, graft copolymers of styrene-methyl methacrylate on rubbers such as polybutadiene (MBS), butadiene-styrene radial block copolymers (e.g. KRO 3 of Phillips Petroleum Co.), selectively hydrogenated butadiene-styrene block copolymers (e.g. Kraton G from Shell Chemical Co.) and mixtures thereof.

8. Polymers and copolymers derived from halogen-containing vinyl monomers such as poly(vinyl chloride), poly(vinyl fluoride), Poly(vinylidene chloride), poly(vinylidene fluoride), Poly(tetrafluoroethylene) (PTFE), vinyl chloride-vinyl acetate copolymers, vinylidene chloride vinyl acetate copolymers and ethylene-tetrafluoroethylene copolymers:

9. Halogenated rubbers such as chlorinated and/or brominated butyl rubbers or polyolefins and fluoroelastomers.

10. Polymers and copolymers derived from alpha, beta-unsaturated acids, anhydrides, esters, amides and nitriles or combinations thereof such as polymers or copolymers of acrylic and methacrylic acids, alkyl and/or glycidyl acrylates and methacrylates, acrylamide and methacrylamide, acrylonitrile, maleic anhydride, maleimide, the various anhydride containing polymers and copolymers described in this disclosure copolymers of the above polymers and various blends and mixtures thereof as well as rubber modified versions of the above polymers and copolymers.

11. Polymers and copolymers derived from unsaturated alcohols or their acylated derivatives such as poly(vinyl alcohol), poly(vinyl acetate), poly(vinyl stearate), poly(vinyl benzoate), poly(vinyl maleate), poly(vinyl butyral), poly(allyl phthalate), poly(allyl diethylene glycol carbonate) (ADC), ethylene-vinyl acetate copolymer and ethylene-vinyl alcohol copolymers.

12. Polymers and copolymers derived from unsaturated amines such as poly(allyl melamine).

13. Polymers and copolymers derived from epoxides such as polyethylene oxide, polypropylene oxide and copolymers thereof as well as polymers derived from bis glycidyl ethers.

14. Poly(phenylene oxides), poly(phenylene ethers) and modifications thereof containing grafted polystyrene or rubbers as well as their various blends with polystyrene, rubber modified polystyrenes or nylon.

15. Polycarbonates and especially the aromatic polycarbonates such as those derived from phosgene and bisphenols such as bisphenol-A, tetrabromobisphenol-A and tetramethylbisphenol-A.

16. Polyester derived from dicarboxylic acids and diols and/or hydroxycarboxylic acids or their corresponding lactones such as polyalkylene phthalates (e.g. polyethylene terephthalate (PET), polybutylene terphthalate (PBT), and poly (1,4-dimethylcyclohexane terephthalate) or copolymers thereof) and polylactones such as polycaprolactone.

17. Polyarylates derived from bisphenols (e.g. bisphenol-A) and various aromatic acids such as isophthalic and terephthalic acids or mixtures thereof.

18. Aromatic copolyestercarbonates having carbonate as well as ester linkages present in the backbone of the polymers such as those derived from bisphenols, iso- and terephthaloyl chlorides and phosgene.

19. Polyurethanes and polyureas.

20. Polyacetals such as polyoxymethylenes and polyoxymethylenes which contain ethylene oxide as a comonomer.

21. Polysulfones, polyethersulfones and polyimidesulfones.

22. Polyamides and copolyamides which are derived from diamines and dicarboxylic acids and/or from aminocarboxylic acids or the corresponding lactones such as the following nylons: 6, 6/6, 6/10, 11 and 12.

23. Polyimides, polyetherimides, polyamideimides and copolyetheresters.

24. Cross-linked polymers which are derived from aldehydes on the one hand and from phenols, ureas and melamine of the other hand such as phenolformaldehyde resins.

25. Alkyd resins such as glycerol-phthalic acid resins and mixtures thereof with melamine-formaldehyde resins.

26. Blends of vinyl monomers and unsaturated polyester resins which are derived from copolyesters of saturated and unsaturated dicarboxylic acids with polyhydric alcohols as well as from vinyl compounds (crosslinking agents) and also halogen-containing, flame resistant modifications thereof.

27. Natural polymers such as cellulose, natural rubber as well as the chemically modified homologous derivatives thereof such as cellulose acetates, cellulose propionate, cellulose butyrate and the cellulose ethers such as methyl and ethyl cellulose.

In addition the novel stabilizers of this invention may be used to stabilize various combinations or blends of the above polymers or copolymers. They are particularly useful in the stabilization of polyolefins, acrylic coatings, styrenics, rubber modified styrenics, poly(phenylene oxides) and their various blends with styrenics, rubber-modified styrenics or nylon.

The polymer bound hindered amine light stabilizers of this invention can be used together with other additives to further enhance the properties of the finished polymer. Examples of other additives that can be used in conjunction with the stabilizers of this invention include other antioxidants such as alkylated monophenols, alkylated hydroquinones, hydroxylated thiodiphenyl acylaminophenols, esters of 3-(3,5-di-t-butyl-4-hydroxyphenyl)propionic acid, esters of 3-(5-t-butyl-4-hydroxy-3-methylphenyl)propionic acid, 3-(3,5-di-t-butyl-4-hydroxyphenyl)propionic acid amides, other UV absorbers and light stabilizers such as 2-(2'hydroxyphenyl)-2H-benzotriazoles, 2-hydroxy benzophenones, benzylidene malonate esters, esters of substituted or unsubstituted benzoic acids, diphenyl acrylates, nickel chelates, oxalic acid diamides, other hindered amine light stabilizers, other additives such as metal deactivators, phosphites and phosphonite,s peroxide decomposers, fillers and reinforcing agents, plasticizers, lubricants, corrosion and rust inhibitors, emulsifiers, mold release agents, carbon black, pigments, fluorescent brighteners, both organic and inorganic flame retardants and non-dripping agents, melt flow improvers and antistatic agents. Numerous examples of suitable additives of the above type are given in Canadian Patent No. 1,190,038. Non-limiting examples of hydrazido functionalized hindered amine light stabilizers of Formula I include the following:

(1) N-(1,2,2,6,6-pentamethyl-4-piperidinyl)-N'-aminooxamide, (2) N-(1-benzoyl-2,2,6,6-tetramethyl-4-piperidinyl)-N'-aminooxamide, (3) N-(1-allyl-2,2,6,6-tetramethyl-4-piperidinyl)-N'-aminooxamide, (4) N-(1-benzyl-2,2,6,6-tetramethyl-4-piperidinyl)-N'-aminooxamide, (5) N-(1-ethoxycarbonyl-2,2,6,6-tetramethyl-4-piperidinyl)-N'-aminooxamide, (6) N-(1-dodecyl-2,6-diethyl-2,3,6-trimethyl-4-piperidinyl)-N'-aminooxamide, (7) N-(2,2,6,6-tetramethyl-4-piperidinyl)-N-butyl-N'-aminooxamide, (8) N-(2,2,6,6-tetramethyl-4-piperidinyl)-N-phenyl-N'-aminosuccinamide, (9) N-(2,2,6,6-tetramethyl-4-piperidinyl)-N-methyl-N'-methyl-N'-aminomalonamide,

(10) N-(2,2,6,6-tetramethyl-4-piperidinyl)-N'-aminoterephthalamide,

(11) N-(2,2,6,6-tetramethyl-4-piperidinyl)-N'-butyl-N'-aminosebacamide,

(12) N-(2,2,6,6-tetramethyl-4-piperidinyl)-N'-aminododecanamide,
(13) N-(2,2,6,6-tetramethyl-4-piperidinyl)-N'-aminosuberamide,
(14) N-(2,2,6,6-tetramethyl-4-piperidinyl)-N'-aminoglutaramide,
(15) N-(2,2,6,6-tetramethyl-3-piperidinyl)-N'-amino-2-methylsuccinamide,
(16) N-(2,2,6,6-tetramethyl-4-piperidinyl)-N'-amino-2,3-dimethylsuccinamide,
(17) N-(2,2,6,6-tetramethyl-4-piperidinyl)-N'-aminopimelamide,
(18) N-(2,2,6,6-tetramethyl-4-piperidinyl)-N'-aminoundecandiamide,
(19) N-(1-beta-hydroxyethyl-2,2,6,6-tetramethyl-4-piperidiny)-N'-aminoadipamide,
(20) N-(1-beta-cyanoethyl-2,2,6,6-tetramethyl-4-piperidinyl)-N'-aminosuccinamide,
(21) N-(1-phenoxycarbonyl-2,2,6,6-tetramethyl-4-piperidinyl)-N'-aminooxamide,
(22) N-(2,6-diethyl-2,3,6-trimethyl-4-piperidinyl)-N'-aminooxamide,
(23) N,N-bis-(2,2,6,6-tetramethyl-4-piperidinyl)-N'-aminooxamide
(24) N-(2,2,6,6-tetramethyl-4-piperidinyl)-N'-methyl-N-methylaminooxamide
(25) N-(1-oxyl-2,2,6,6-tetramethyl-4-piperidinyl)-N'-methyl-N'-aminooxamide
(26) N-(1-cyclohexyl-2,2,6,6-tetramethyl-4-piperidinyl)-N'-aminooxamide
(27) N-(1-cyclohexylcarbonyl-2,2,6,6-tetramethyl-4-piperidinyl)-N'-aminosuccinamide
(28) N-[1-(beta-phenylethyl)-2,2,6,6-tetramethyl-4-piperidinyl]-N'-aminoadipamide
(29) N-(1-dimethylcarbamoyl-2,2,6,6-tetramethyl-4-piperidinyl)-N'-aminooxamide
(30) N-[1-(2-dibutylamino-2-oxoacetyl)-2,2,6,6-tetramethyl-4-piperidinyl]-N'-aminooxamide
(31) N-[1-(2-methoxy-2-oxoacetyl)-2,2,6,6-tetramethyl-4-piperidinyl]-N'-aminosuccinamide
(32) N-[1-(ethoxycarbonylmethyl)-2,2,6,6-tetramethyl-4-piperidinyl]-N'-aminooxamide
(33) N-[1-{butoxypoly(propoxy)ethyl}-2,2,6,6-tetramethyl-4-piperidinyl]-N'-aminooxamide Non-limiting examples of hydrazido functionalized hindered amine light stabilizers of Formula II include the following:

1) N,N'-hexamethylenebis[N-(2,2,6,6-tetramethyl-4-piperidinyl)oxamic acid hydrazide]
2) N,N'-hexamethylenebis[N-(1-acetyl-2,2,6,6-tetramethyl-4-piperidinyl)oxamic acid hydrazide]
3) N,N'-hexamethylenebis[N-(1-allyl-2,2,6,6-tetramethyl-4-piperidinyl)oxamic acid hydrazide]
4) N,N'-hexamethylenebis[N-(1-benzoyl-2,2,6,6-tetramethyl-4-piperidinyl)oxamic acid hydrazide]
5) N,N'-ethylenebis[N-(1,2,2,6,6-pentamethyl-4-piperidinyl)oxamic acid hydrazide]
6) N,N'-tetramethylenebis[N-(2,6-diethyl-2,3,6-trimethyl-4-piperidinyl)oxamic acid hydrazide]
7) N,N'-decamethylenebis[N-(1-hydroxy-2,2,6,6-tetramethyl-4-piperidinyl)oxamic acid hydrazide]
8) N,N'-dodecamethylenebis[N-(1-benzyl-2,2,6,6-tetramethyl-4-piperidinyl)oxamic acid hydrazide]
9) N,N'-hexamethylenebis[N-(2,2,6,6-tetramethyl-4-piperidinyl)succinamic acid hydrazide]
10) N,N'-hexamethylenebis[N-(1-acetyl-2,2,6,6-tetramethyl-4-piperidinyl)succinamic acid hydrazide]
11) N,N'-hexamethylenebis[N-(1-allyl-2,2,6,6-tetramethyl-4-piperidinyl)succinamic acid hydrazide]
12) N,N'-hexamethylenebis[N-(2,2,6,6-tetramethyl-4-piperidinyl)-malonamic acid hydrazide]
13) N,N'-hexamethylenebis [N-(2,2,6,6-tetramethyl-4-piperidinyl)-adipamic acid hydrazide]
14) N,N'-hexamethylenebis [N-(1-butyl-2,2,6,6-tetramethyl-4-piperidinyl)adipamic acid hydrazide]
15) N,N'-hexamethylenebis [N-(2,2,6,6-tetramethyl-4-piperidinyl)-azelamic acid hydrazide]
16) N,N'-hexamethylenebis [N-(1-propionyl-2,2,6,6-tetramethyl-4-piperidinyl)azelamic acid hydrazide]

Non-limiting examples of hydrazido functionalized 2-(2-hydroxyphenyl)-2H-benzotriazoles of Formula III include the following:

1) 2-{[2-hydroxy-3-(2H-benzotriazol-2-yl)-5-methylphenyl]-methylamino}-2-oxoacetyl hydrazide
2) 3-{N-[2-hydroxy-3-(2H-benzotriazol-2-yl)-5-t-butylphenyl]methyl-N-methylamino}-3-oxo-N'-methylpropionyl hydrazide
3) 4-{N-[2-hydroxy-3-(5-chloro-2H-benzotriazol-2-yl)-5-ethylphenyl]methyl-N-butylamino}-4-oxobutanoyl hydrazide
4) 4-{N-[2-hydroxy-3-(5-(ethoxycarbonyl)-2H-benzotriazol-2-yl)-5-t-amylphenyl]methyl-N-ethylamino}-4-oxobutanoyl hydrazide
5) 9-{[2-hydroxy-3-(5-[aminocarbonyl]-2H-benzotriazol-2-yl)-5-(1-methyl-1-phenylethyl)phenyl]methylamino}-9-oxononanoyl hydrazide
6) 7-{[2-hydroxy-3-(5-[carboxy]-2H-benzotriazol-2-yl)-5-(1-ethylpentyl)-phenyl]methylamino}-7-oxo-4-thia-N'-(benzyl)heptanoyl hydrazide
7) 3-[3-(2H-benzotriazol-2-yl)-4-hydroxy-5-t-octylphenyl]-N'-(propyl)propionyl hydrazide
8) 2-[3-(5-chloro-2H-benzotriazol-2-yl)-4-hydroxy-5-t-butylphenyl]-N'-(cyclohexyl)acetyl hydrazide
9) 42-[3-hydroxy-4-(2H-benzotriazol-2-yl)phenoxy]-N'-methylacetyl hydrazide
10) 3-[3-hydroxy-4-(5-chloro-2H-benzotriazol-2-yl)phenylamino]-3-oxo-N'-(butyl)propionyl hydrazide
11) 5-{N-[3-hydroxy-4-(5-ethyl-2H-benzotriazol-2-yl)phenyl]-N-methylamino}-N'-(octyl)pentanoyl hydrazide
12) 2-(2-hydroxy-5-methylphenyl)-2H-benzotriazol-5-carboxylic hydrazide
13) 2-(2-hydroxy-5-t-butylphenyl)-6-chloro-2H-benzotriazol-5-carboxylic hydrazide
14) 2-[2-hydroxy-5-(1-methyl-1-phenylethyl)phenyl]-6-methyl-2H-benzotriazol-5-carboxylic hydrazide
15) 2-(2-hydroxy-5-t-octylphenyl)-6-methoxy-2H-benzotriazol-5-carboxylic hydrazide
16) 2-(2-hydroxy-5-ethylphenyl)-6-butoxy-N'-ethyl-2H-benzotriazol-5-carboxylic hydrazide
17) 2-(2-hydroxy-5-propylphenyl)-6-(ethoxycarbonyl)-N'-benzyl-2H-benzotriazol-5-carboxylic hydrazide
18) 2-(2-hydroxy-5-ethoxyphenyl)-6-(butylaminocarbonyl)-N'-methyl-2H-benzotriazol-5-carboxylic hydrazide
19) 2-(2-hydroxy-5-(dimethylaminocarbonyl)phenyl)-6-(diethylaminocarbonyl)-2H-benzotriazol-5-carboxylic hydrazide
20) 2-(2-hydroxy-5-butylphenyl)-6-(methoxysulfonyl)-N'-(propyl)-2H-benzotriazol-5-carboxylic hydrazide.

The best mode contemplated by the inventors is further illustrated by the following illustrative, non-limiting, specific examples.

EXAMPLES

Preparation of or Source of Starting Materials

Ethyl N-(2,2,6,6-tetramethyl-4-piperidinyl)oxamate was prepared by reacting 4-amino-2,2,6,6-tetramethylpiperidine with an excess of diethyl oxalate and subsequently stripping off the excess diethyl oxalate.

HALS-1

N-(2,2,6,6-tetramethyl-4-piperidinyl)-N'-aminooxamide was prepared by the hydrazinolysis of ethyl N-(2,2,6,6-tetramethyl-4-piperidinyl)oxamate with 64% aqueous hydrazine in methanol.

HALS-2

N-(2,2,6,6-tetramethyl-4-piperidinyl)-N'-aminosuccinamide was prepared by the reaction of 4-amino-2,2,6,6-tetramethylpiperidine with ethyl succinyl chloride followed by hydrazinolysis of the resulting ester with 64% aqueous hydrazine in methanol.

Diethyl N,N'-hexamethylenebis[N-(2,2,6,6-tetramethyl-4-piperidinyl)oxamate] was prepared by reacting 1,6-hexamethylene triacetonediamine (product of Huls) with ethyl oxalyl chloride in methylene chloride and neutralizing the hydrochloride salt that forms with aqueous sodium carbonate solution. The diester is obtained upon evaporation of the methylene chloride solvent.

HALS-3

N,N'-Hexamethylenebis[N-(2,2,6,6-tetramethyl-4-piperidinyl)oxamic acid hydrazide] was prepared by the hydrazinolysis of diethyl N,N'-hexamethylenebis[N-(2,2,6,6-tetramethyl-4-piperidinyl)oxamate] with 64% aqueous hydrazine in methanol. The hydrazide was isolated by evaporating the methanol solvent, slurrying the residue in tetrahydrofuran and filtering off the solid product.

HALS-4

N-(2,2,6,6-tetramethyl-4-piperidinyl)-N'-methylaminooxamide was prepared by reacting ethyl N-(2,2,6,6-tetramethyl-4-piperidinyl)oxamate with 97% methyl hydrazine in methanol.

Epon$^R$ 828 is a bisphenol A glycidyl ether type epoxy resin having an epoxy equivalent of 175-210 and was obtained from Shell Chemical Co.

Tactix$^R$ 123 is a bisphenol A glycidyl ether type epoxy resin having an epoxy equivalent of 172-176 and was obtained from Dow Chemical Co.

LSE 4107 TM is a 60% solution of 2,3-epoxypropanamide-glycidamide melamine resin in n-butanol and 1-methoxy-2-propanol and was obtained from Monsanto Chemical Co. Tinuvin 770 ® is a product of Ciba-Geigy Corporation and is a hindered amine light stabilizer. Its chemical name is bis-(2,2,6,6-tetramethyl-4-piperidinyl) sebacate.

EXAMPLE I

Curing of Epon ® 828 with HALS-1

Into a 50 ml erlenmeyer flask was weighed 16.1 grams of Epon 828 and 12.1 grams (0.05 mole) HALS-1. The flask was equipped with a magnetic stirrer and a Y-tube containing a thermometer and reflux condenser. The mixture was heated in an oil bath at 135° C. The reaction turned clear and the temperature began to rise quickly. At 150° C. the reaction stopped stirring and the thermometer was removed so it wouldn't be cured into the resin. The flask was removed from the bath and allowed to cool. A very hard cured resin was obtained. It was isolated by breaking the flask around the resin.

EXAMPLE II

Curing of Tactix ® 123 with HALS-1

Into a 50 ml erlenmeyer flask was weighed 17.4 grams of Tactix 123(0.05 eq. epoxy) and 12.1 grams (0.05 m) HALS-1. The flask was equipped with a magnetic stirrer and a Y-tube containing a thermometer and reflux condenser. The mixture was heated in an oil bath. When the temperature of the reaction mixture reached 130° C. a reaction began to occur and the temperature rose to 186° C. over the next 10 minutes and the viscosity of the mixture increased until stirring stopped. The temperature slowly dropped back to 125° C. over the next ½ hour. The heating bath was removed and upon cooling to 80° C. the erlenmeyer flask broke due to the expansion of the cured resin. The reaction mass was a very hard clear solid which would not break upon hitting with a hammer.

The reaction was repeated except only 6.05 grams (0.025 m) HALS-1 was used. Upon heating to 130° C. reaction occurred and the temperature rose to 152° C. over the next 15 minutes and stirring stopped. The temperature dropped back to 128° C. over the next hour. Upon cooling the erlenmeyer flask broke leaving a very hard clear solid which would not break upon hitting with a hammer.

EXAMPLE III

Attachment of HALS-1 to Epon ® 828

Into a 50 ml erlenmeyer flask was weighed 16.1 grams of Epon 828 and 0.5 grams HALS-1. The flask was equipped with a magnetic stirrer and a Y-tube containing a thermometer and a reflux condenser. The mixture was heated in an oil bath and at 50° C. the viscosity had decreased sufficiently that the magnetic stirrer began to work and the hydrazide slowly dissolved in the resin. The reaction was heated to 130° C. and stirred 3 hours at 130°-135° C. The reaction mixture was then cooled back to room temperature. It was more viscous than the starting epoxy resin. The liquid chromatography scan of the product showed the presence of a higher molecular weight peak in about 15% concentration.

The product was suitable for curing with an auxiliary curing agent.

The reaction was repeated except 1.0 gram of HALS-1 was used. A liquid chromatography scan indicated very little of the high molecular weight peak formed before the temperature reached 130° C.

After stirring 40 minutes at 130°-137° C., the formation of the higher molecular weight peak was substantial and after stirring 3 hours at 130°-137° C. the high molecular weight peak was present in about 30% concentration. The reaction mixture was cooled to room temperature and drained out of the reaction flask into a poly bottle with the aid of a heat gun.

The product may be used with an auxiliary curing agent or it may be used as a master batch and added to additional epoxy resin prior to curing it.

EXAMPLE IV

Curing of Monsanto's LSE 4107 ™ Epoxy Resin with HALS-1

Into a 50 ml erlenmeyer flask was weighed 16 grams of Monsanto's LSE 4107 and 7.3 grams of HALS-1. The flask was equipped with a magnetic stirrer and a Y-tube containing a thermometer and reflux condenser. The flask was immersed in an oil bath and heated to 115° C. At 90° C. a clear yellow liquid formed. As the temperature reached 110° C. the reaction became very viscous and stopped stirring. The reaction mixture was held at 110°–115° C. for 1 hour and then cooled to room temperature. The reaction mass could not be removed from the flask. The flask was filled with acetone and allowed to stand overnight. The acetone swelled the resin and it was possible to remove the resin from the flask. The residue was air dried on an evaporating dish and then vacuum dried at 70° C. overnight. The residue after pulverizing into a fine powder weighed 16.9 grams. The reaction was repeated except only 0.5 grams of HALS-1 was used. After heating 1 hour at 115° C. the reaction mixture had become very viscous and samples were no longer soluble in tetrahydrofuran. After heating for another hour at 115° C., a viscous gel had formed. The flask was removed from the oil bath, cooled and the gelatinous product scraped out of the flask. After vacuum drying and pulverizing the residue, 8.3 grams of a light yellow powder was obtained.

EXAMPLE V

Reaction of HALS-1 with Vinylcyclohexene Dioxide

Into a 50 ml erlenmeyer flask was weighed 10.6 grams (0.075 m) vinylcyclohexene dioxide and 3.1 grams (0.0125 m) of HALS-1. The flask was equipped with a magnetic stirrer and a Y-tube containing a thermometer and reflux condenser. The flask was immersed in an oil bath and heated to 160° C. and heated 5 hours at 155°–160° C. Samples were pulled periodically and scanned on the liquid chromatograph. A sample pulled at 140° C. and scanned indicated no reaction had occurred. After 1 hour at 160° C., approximately ½ of the HALS hydrazide had been monoalkylated with the vinylcyclohexene dioxide. After 3 hours at 155°–160° C. nearly all the HALS hydrazide had reacted and almost all the monoalkylated product had been converted to dialkylated product. After 5 hours at 155°–160° C., essentially all the monoalkylated product had been converted to polyalkylated product and the product was very viscous.

EXAMPLE VI

Reaction of HALS-1 with 3,4-Epoxycyclohexyl 3,4-Epoxycyclohexanecarboxylate

Into a 50 ml erlenmeyer flask was weighed 17.8 grams (0.075 m) 3,4-epoxycyclohexyl 3,4-epoxycyclohexanecarboxylate and 3.1 grams HALS-1. The flask was equipped with a magnetic stirrer and a Y-tube containing a thermometer and reflux condenser. The flask was immersed in an oil bath and heated to 145° C. and held for 6 hours at 145°–150° C. Samples were taken periodically and scanned on the liquid chromatograph. A sample was taken when the temperature reached 125° C. and the liquid chromatography scan indicated only small amounts of the monoalkylated HALS hydrazide and only trace amounts of the dialkylated HALS hydrazide. After 1 hour at 145° C. there was a considerable amount of the monoalkylated HALS hydrazide and small amounts of the dialkylated HALS hydrazide. After 3 hours at 145° C., the amount of monoalkylated HALS hydrazide was about equal to the amount of unreacted HALS hydrazide. After 5 hours at 145° C. most of the HALS hydrazide had been converted to the monoalkylated product and only 20–25% had been converted to the dialkylated product.

Infrared scans taken throughout the reaction indicated the HALS hydrazide was not attacking the ester group as the ester carbonyl band at 1730 cm−1 remained intact throughout the reaction.

EXAMPLES VII–XVII

Preparation and Evaluation of Cured Coatings

A. Preparation of Coatings

Samples of Epon 828 and Tactix 123 were partially cured by reacting them with a small amount of a HALS hydrazide of Formula I or II at approximately 130° C. for 2 hours. The partially cured resin was cooled to 50° C. and Jeffamine D-400, an auxiliary curing agent added. The mixture was stirred for 10 minutes to obtain a uniform solution. A small amount of the resin (0.5–1.0 g) was then poured onto 3"×6" cold roll steel panels and spread out on the panels to form uniform thin coatings. The panel was then suspended vertically from a crossbar overnight at room temperature to allow any excess resin to drain off. A thin uniform coating resulted. The next morning the partially cured coatings were completely cured by placing the panels in a 125° C. oven for 30 minutes.

For comparison sake, samples were prepared with each epoxy resin where a HALS hydrazide of Formula I was added to the epoxy resin (Examples IX and XVI) but the mixtures were only heated to 50° C. to dissolve the HALS hydrazide in the resin.

(At this temperature the HALS hydrazide does not react with the epoxy resin and consequently the HALS group does not become bound to the resin and will be susceptible to extraction from the finished coating.) After the HALS hydrazide dissolved, the Jeffamine D-400 curing agent was added, the mixture was stirred 10 minutes at 50° C., the panels coated with 0.5–1.0 g of the resin as above and suspended vertically overnight at room temperature. The next morning the partially cured coatings were cured in a 125° C. oven for 30 minutes.

Control samples of each epoxy resin without any light stabilizer (Examples VII and XIV) were prepared by adding Jeffamine D-400 to the epoxy resins, stirring 10 minutes at 50° C. and coating the panels according to the above procedure. After hanging overnight at room temperature, the panels were cured in a 125° C. oven for 30 minutes.

Control samples containing Tinuvin 770 (Examples XIII and XVII) were also prepared in the same manner. The Tinuvin 770 was added to the epoxy resins, warmed to 50° C. and stirred until the Tinuvin 770 dissolved. Then the Jeffamine D-400 curing agent was added, the mixture stirred 10 minutes at 50° C. and the panels coated according to the above procedure. After hanging overnight at room temperature, the panels were cured in a 125° C. oven for 30 minutes.

The composition of the various formulations are found in Table I.

B. QUV-Weathering of Coatings

The coated panels were placed in a QUV Accelerated Weathering Tester (Q Panel Company). The QUV contained UV-B bulbs and operated with an 8 hour light cycle at 60° C. and a 4 hour condensation cycle at 50° C. The panels were checked periodically. All the coatings lost their gloss and took on an olive green color within 2 days. Upon longer exposure the coatings began to corrode and finally began to wash away. The first signs of corrosion, i.e. cracks forming in the coating, was noted as well as the approximate number of days where portions of the coating had washed away exposing the metal surface (considerable corrosion) and finally when the coating had essentially washed away (90% or more of the metal surface exposed).

The results are summarized in Table II. The unstabilized coatings (Examples VII and XIV) and those containing the commercial stabilizer Tinuvin 770 (Examples XIII and XVII) corroded in approximately the same time frame. Inclusion of HALS-1 in the formulation without binding it to the resin (Examples IX and XVI) delayed corrosion slightly. However, binding the HALS hydrazides to the resin prolonged the onset of corrosion markedly. HALS-1 and HALS-3 bound to the resin in Examples VIII, XI and XV were very efficient in stabilizing the coating against degradation by QUV-B light.

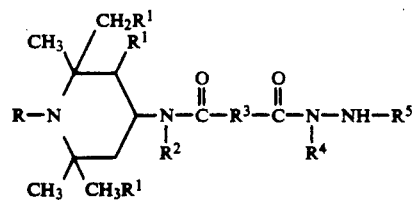

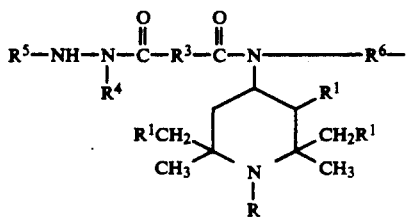

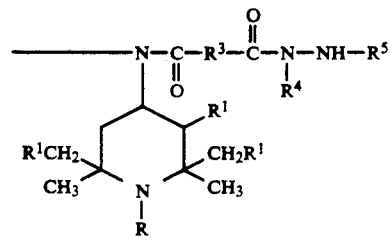

TABLE I

| | COATING FORMULATIONS | | | | | | | | | | |
|---|---|---|---|---|---|---|---|---|---|---|---|
| Example # | VII | VIII | IX | X | XI | XII | XIII | XIV | XV | XVI | XVII |
| Epon 828 (g) | 16.1 | 16.1 | 16.1 | 16.1 | 16.1 | 16.1 | 16.1 | | | | |
| Tactix 123 (g) | | | | | | | | 16.1 | 16.1 | 16.1 | 16.1 |
| HALS-1 (g) | | 0.5 | 0.5* | | | | | | | 0.5 | 0.5* |
| HALS-2 (g) | | | | 0.5 | | | | | | | |
| HALS-3 (g) | | | | | 0.5 | | | | | | |
| HALS-4 (g) | | | | | | 0.5 | | | | | |
| Tinuvin 770 (g) | | | | | | | | | 0.5 | | 0.5 |
| Jeffamine D-400 (g) | 8.8 | 8.8 | 8.8 | 8.8 | 8.8 | 8.8 | 8.8 | 8.8 | 8.8 | 8.8 | 8.8 |

*HALS-1 was stirred into epoxy resin at 50° C. and stirred until dissolved. Resin was not heated to 130° C. to attach the HALS-1.

TABLE II

QUV-B WEATHERING EVALUATIONS

| | DAYS IN QUV UNTIL | | |
|---|---|---|---|
| EXAMPLE # | 1st Signs of Corrosion | Considerable Corrosion | Coating Washed Away |
| VII | 11 | 25 | 40 |
| VIII | >102 | >102 | >102 |
| IX | 11 | 29 | 56 |
| X | 29 | 40 | 50 |
| XI | >102 | >102 | >102 |
| XII | 35 | 42 | 50 |
| XIII | 11 | 20 | 31 |
| XIV | 14 | 19 | 31 |
| XV | 50 | 61 | 75 |
| XVI | 14 | 29 | 42 |
| XVII | 11 | 20 | 29 |

We claim:
1. A curable composition comprising:
 a) one or more polyepoxides containing an average of at least 1.75 reactive 1,2-epoxy groups per molecule, with the proviso that said polyepoxides do not include glycidyl esters of acrylic or methacrylic acids;
 b) a hindered amine compound of formula I, formula II, or mixtures thereof wherein:
R is hydrogen, oxyl, hydroxyl, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aromatic acyl of 7-11 carbons, substituted or unsubstituted araliphatic acyl of 7-22 carbons, $-[C-(=O)]_a-N(R^7)(R^8)$, $-[C(=O)]_a-O-R^9$, $-(CH_2)_a-C(=O)-O-R^{10}$ or $-CH_2-CH_2-[CH_2-CH(R^1)-O]_b-R^{11}$ where a is 1-2 and b is 2-50, $R^1$ hydrogen or aliphatic of 1-4 carbons, $R^2$ is hydrogen, substituted or unsubstituted aliphatic of 1-20 carbons, substituted or unsubstituted alicyclic of 5-12 carbons, substituted or unsubstituted aryl of 6-14 carbons, substituted or unsubstituted araliphatic of 7-22 carbons or 2-cyanoethyl and when alicyclic, $R^2$ may optionally contain $-N(R^{12})-$ as a ring member, $R^3$ is a direct bond, substituted or unsubstituted aliphatic diradical of 1-20 carbons, substituted or unsubstituted aryl diradical of 6-12 carbons, substituted or unsubstituted alicyclic diradical of 5-12 carbons, or substituted or unsubstituted araliphatic diradical of 7-22 carbons where these diradicals may optionally contain 1-6 oxygen, sulfur or nitrogen hereoatoms with the proviso that multiple heteroatoms must be separated from each other and the diradical ends by at least one carbon atom, $R^2$ and $R^3$ optionally may be linked together to form a 5-membered lactam ring, $R^4$ is hydrogen, substituted or unsubstituted aliphatic of 1-20 carbons, substituted or unsubstituted araliphatic of 7-22 carbons or substituted or unsubstituted alicyclic of 5-12 carbons, $R^5$ is hydrogen, substituted or unsubstituted aliphatic of 1-20 carbons, substituted or unsubstituted alicyclic of 5-12 carbons or substituted or unsubstituted araliphatic of 7-22 carbons, $R^6$ is a substituted or unsubstituted aliphatic diradical of 2-18 carbons, substituted or unsubstituted alicyclic diradical of 5-18 carbons, or substituted or unsubstituted araliphatic diradical of 7-18 carbons, the aliphatic chains of which may optionally contain heteroateoms —O—, —S— or —N($R^{12}$)— with the proviso that multiple heteroatoms must be separated from each other and the diradical ends by at least two carbon atoms, $R^7$ and $R^8$ are independently hydrogen, substituted or unsubstituted aliphatic of 1-20 carbons, substituted or unsubstituted aryl of 6-14 carbons, substituted or unsubstituted araliphatic of 7-22 carbons or substituted or unsubstituted alicyclic of 5-12 carbons which may optionally contain —N($R^{12}$)— as a ring member and optionally $R^7$ and $R^8$ may be linked together by a direct bond or through a heteroatom —N($R^{12}$)— or —O— to form a heterocyclic ring of 5-7 atoms, $R^9$ is substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons, $R^{10}$ is hydrogen, substituted or unsubstituted aliphatic of 1-20 carbons, substituted or unsubstituted alicyclic of 5-12 carbons, substituted or unsubstituted aryl of 6-14 carbons or substituted or unsubstituted araliphatic of 7-22 carbons, $R^{11}$ is hydrogen or aliphatic of 1-4 carbons, $R^{12}$ is hydrogen, substituted or unsubstituted aliphatic of 1-20 carbons, substituted or unsubstituted alicyclic of 5-12 carbons, substituted or unsubstituted araliphatic of 7-22 carbons, substituted or unsubstituted aliphatic acyl of 2-20 carbons, substituted or unsubstituted alicyclic acyl of 7-16 carbons, substituted or unsubstituted aryl acyl of 7-11 carbons, substituted or unsubstituted araliphatic acyl of 7-22 carbons, —[C(=O)-]$_a$—N($R^7$)($R^8$), —[C(=O)]$_a$—O$R^9$, —(CH$_2$)$_a$—C(=O)—OR$^{10}$ or —[CH$_2$—CH($R^1$)—O]$_b$—$R^{11}$ where a is 1-2 and b is 2-50, and substituents for R, $R^2$, $R^3$, $R^4$, $R^5$, $R^6$, $R^7$, $R^8$, $R^9$, $R^{10}$ and $R^{12}$ are one or more of the following: chloro, bromo, alkyl of 2-8 carbons, alkoxy of 1-12 carbons, phenoxy, cyano, hydroxy, epoxy, carboxy, benzoyl, benzoyloxy, dialkylamino of 2-8 carbons, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons or trialkoxysilyl of 3-12 carbons; and c) a benzotriazole compound of Formula III:

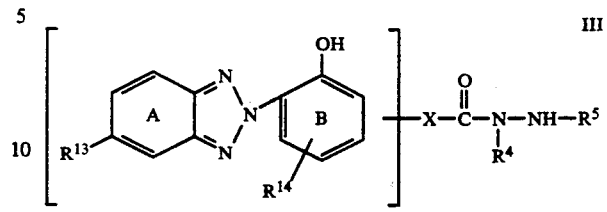

wherein $R^4$ and $R^5$ are as defined hereinabove, and $R^{13}$ is hydrogen, chlorine, bromine, substituted or unsubstituted aliphatic of 1-8 carbons, substituted or unsubstituted alkoxy of 1-8 carbons, substituted or unsubstituted alkoxycarbonyl of 2-8 carbons, alkylaminocarbonyl of 2-5 carbons, dialkylaminocarbonyl of 3-9 carbons, substituted or unsubstituted N-(alkyl)-N-(aryl)aminocarbonyl of 8-15 carbons, alkoxysulfonyl of 1-4 carbons, —C(=O)OH, —C(=O)NH$_2$, —S(=O)$_2$—OH or $X_A$, $R_{14}$ is hydrogen, substituted or unsubstituted aliphatic of 1-8 carbons, substituted or unsubstituted aryl of 6-14 carbons, substituted or unsubstituted araliphatic of 7-22 carbons, substituted or unsubstituted alkoxy of 1-8 carbons, alkylaminocarbonyl of 2-5 carbons, dialkylaminocarbonyl of 3-9 carbons, or substituted or unsubstituted N-(alkyl)-N-(aryl)aminocarbonyl of 8-15 carbons or $X_B$, X is $X_A$ when attached to ring A in Formula III, or $X_B$ when attached to ring B in Formula III, $X_A$ is a direct bond, $X_B$ is a divalent radical of formula

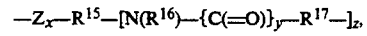

Z is —O—, —N($R^{16}$)—, —S— or —S(=O)$_2$—, x, y and z are independently 0 or 1, $R^{15}$ is a direct bond or substituted or unsubstituted alkylene diradical of 1-4 carbons, $R^{16}$ is hydrogen, substituted or unsubstituted aliphatic of 1-20 carbons, substituted or unsubstituted alicyclic of 5-12 carbons, substituted or unsubstituted aryl of 6-14 carbons, or substituted or unsubstituted araliphatic of 7-22 carbons, $R^{17}$ is a direct bond, substituted or unsubstituted aliphatic diradical of 1-20 carbons, substituted or unsubstituted aryl diradical of 6-12 carbons, substituted or unsubstituted alicyclic diradical of 5-12 carbons, substituted or unsubstituted araliphatic diradical of 7-22 carbons which optionally may contain 1-6 —O—, —S— or —NH-heteroatoms with the proviso that multiple heteroatoms must be separated from each other and the diradical ends by at least one carbon atom, and substituents for $R^{13}$, $R^{14}$, $R^{15}$, $R^{16}$ and $R^{17}$, are one or more of the following: chloro, bromo, alkyl of 2-8 carbons, alkoxy of 1-12 carbons, phenoxy, cyano, hydroxy, epoxy, carboxy, benzoyl, benzoyloxy, dialkylamino of 2-8 carbons, alkoxycarbonyl of 2-6 carbons, acyloxy of 1-4 carbons, acryloyl, acryloyloxy, methacryloyl, methacryloyloxy, hydroxymethyl, hydroxyethyl, alkylthio of 1-4 carbons or trialkoxysilyl of 3-12 carbons.

2. A composition as defined in claim 1 where

R is hydrogen, substituted or unsubstituted aliphatic of 1–4 carbons, substituted or unsubstituted araliphatic of 7–10 carbons, substituted or unsubstituted aliphatic acyl of 2–6 carbons or substituted or unsubstituted benzoyl, $R^1$ is hydrogen or methyl, $R^2$ is hydrogen, alkyl of 1–4 carbons or 2,2,6,6-tetramethyl-4-piperidinyl, $R^3$ is a direct bond, substituted or unsubstituted alkylene diradical of 1–8 carbons or substituted or unsubstituted o-, m-or p-phenylene diradical, $R^4$ is hydrogen, $R^5$ is hydrogen, alkyl of 1–8 carbons, cyclohexyl or benzyl, $R^6$ is a substituted or unsubstituted aliphatic diradical of 2–12 carbons, X is $X_B$ and $X_B$ is $-Z_x-R^{15}-[N(R^{16})-\{C(=O)\}_y-R^{17}-]_z$ x is 0 and y and z are 1
or x and z are 0

$R^{13}$ is hydrogen, substituted or unsubstituted aliphatic of 1–8 carbons, substituted or unsubstituted alkoxy of 1–8 carbons, methoxycarbonyl, ethoxycarbonyl, carboxy, chloro, or $S(=O)_2OH$ $R^{14}$ is hydrogen, substituted or unsubstituted aliphatic of 1–8 carbons, substituted or unsubstituted araliphatic of 7–9 carbons, or $X_B$, $R^{15}$ is a direct bond, methylene or 1,2-ethanediyl, $R^{16}$ is hydrogen, substituted or unsubstituted aliphatic of 1–12 carbons, substituted or unsubstituted alicyclic of 5–8 carbons, substituted or unsubstituted phenyl or substituted or unsubstituted araliphatic of 7–9 carbons, and $R^{17}$ is a direct bond or alkylene diradical of 2–8 carbons.

3. A composition as defined in claim 2 where

R is hydrogen, methyl, acetyl or benzoyl, $R^1$ is hydrogen $R^2$ is hydrogen $R^3$ is a direct bond or substituted or unsubstituted alkylene diracdical of 1–7 carbons, $R^4$ is hydrogen, $R^5$ is hydrogen, methyl or ethyl, $R^6$ is an alkylene diradical of 2–10 carbons, X is $X_B$ and $X_B$ is $-Z_x-R^{15}-[N(R^{16})-\{C(=O)\}_y-R^{17}-]_z$ where x and y are 0 and $R^{15}$ is 1,2-ethanediyl, $R^{13}$ is hydrogen, alkyl of 1–4 carbons, methoxy, ethoxy, chloro or carboxy, and $R^{14}$ is methyl, ethyl, t-butyl, t-octyl or 2-methyl-2-phenylethyl.

4. A composition as defined in claim 1 comprising:
a) one or more polyepoxides as defined in claim 1;
b) 0.01–0.99 equivalents per epoxide equivalent of a hindered amine compound of Formula I or Formula II or combination thereof, and
c) 0.01–0.99 equivalents per epoxide equivalent of a benzotriazole compound of Formula III.

5. A composition as defined in claim 4 where the hindered amine compound is a compound of Formula I where R, $R^1$, $R^2$ and $R^4$ are hydrogen, $R^3$ is a direct bond or 1,2-ethanediyl and $R^5$ is hydrogen or methyl and the benzotriazole compound is a compound of Formula III where $R^4$, $R^5$, and $R^{13}$ are hydrogen, $R^{14}$ is t-butyl, X is $X_B$ and $X_B$ is $-Z_x-R^{15}-[N(R16)-\{C(=O)\}_y-R^{17}-]_z$ and x and z are 0 and $R^{15}$ is 1,2-ethanediyl.

6. A composition as defined in claim 4 where the hindered amine compound is a compound of Formula II where R, $R^1$, $R^4$ and $R^5$ are hydrogen, $R^3$ is a direct bond and $R^6$ is 1,6-hexanediyl and the benzotriazole compound is a compound of Formula III where $R^4$, $R^5$, and $R^{13}$ are hydrogen, $R^{14}$ is t-butyl, X is $X_B$ and $X_B$ is $-Z_x-R^{15}-[N(R^{16})-\{C(=O)\}_y-R^{17}-]_z$ and x and z are 0 and $R^{15}$ is 1,2-ethanediyl.

7. A composition as defined in claim 1 wherein the polyepoxide is a diglycidyl or polyglycidyl ether of a polyhydric phenol or an advanced dihydric phenol.

8. A composition as defined in claim 1 wherein the polyepoxide is vinylcyclohexane dioxide or 3,4-epoxycyclohexyl-3,4-epoxycyclohexanecarboxylate.

9. A composition as defined in claim 1 wherein the polyepoxide is a 2,3-epoxypropionamide-glycidamide-melamine resin.

10. A light stabilized composition comprising the reaction product of one or more polyepoxides as defined in claim 1, a hindered amine compound of formula I, formula II or mixtures thereof and benzotriazole compound of formula III as defined in claim 1.

11. A light stabilized composition comprising the product of the reaction between one or more polyepoxides as defined in claim 1, a hindered amine compound of formula I, formula II or mixtures thereof and a benzotriazole compound of formula III as defined in claim 1 and an auxiliary curing agent and wherein the auxiliary curing agent is added to the composition after reaction between the hindered amine compound, the benzotriazole and the polyepoxide is substantially complete.

12. A process for preparing a cured light stabilized epoxy resin comprising heating a curable composition as defined in claim 1 wherein the hindered amine compound and benzotriazole compound together are present at from about 0.70 to about 1.30 equivalents per epoxy equivalent at from about 100° to about 200° C. for sufficient time to effect hard cure.

13. A process as defined in claim 12 wherein the polyepoxide is a polygycidyl ether resin.

14. A process for preparing a cured light stabilized epoxy resin which comprises:
(A) heating a curable composition as defined in claim 1 wherein the hindered amine compound and benzotriazole compound are present in a ratio of from about 0.02 to 0.2 equivalents per epoxy equivalent at about 100° to about 200° C. for a period of time sufficient to partially advance curing the composition,
(B) cooling said partially cured composition from step A to below about 100° C.,
(C) combining with the cooled composition of step B from about 0.70 to about 4.0 active hydrogen equivalents per epoxy equivalent of an auxiliary curing agent, and
(D) heating the mixture of step C at from about 100° to about 250° C. for sufficient time to effect hard cure.

15. A process as defined in claim 14 wherein the polyepoxide is a polygycidyl ether resin, the hindered amine compound is a compound of formula I wherein R,$R^1$,$R^2$ and $R^4$ are hydrogen, $R^3$ is a direct bond or 1,2 ethanediyl and $R^5$ is hydrogen or methyl or a compound of formula II wherein R, $R^1$, $R^4$ and $R^5$ are hydrogen, $R^3$ is a direct bond and $R^6$ is 1,6-hexanediyl and in the benzotriazole compound $R^4$, $R^5$, and $R^{13}$ are hydrogen, $R^{14}$ is t-butyl, X is $X_B$, $X_B$ is $-Z_x-R^{15}-N(R^{16})-\{C(=O)\}_y-R^{17}-]_2$, x and y are 0, $R^{15}$ is ethanediyl and the auxiliary curing agent is a primary or secondary aliphatic, or cycloaliphatic polyamine, an aromatic polyamine, a polyoxyalkylene polyamine, a polyamide amine, or mixtures thereof.

16. An article of manufacture prepared by the process of claim 14 additionally comprising applying the mixture obtained in step C of claim 14 to the surface of a substrate and then performing step D.

17. A process as defined in claim 14 wherein the auxiliary curing agent is diethylenetriamine, triethylenetetramine, isophorone diamine, N-aminoethylpiperazine, 4,4-diaminodiphenylmethane, 4,4'-diaminodiphenylsulfone, m- or p-phenylenediamine, polyoxypropylenediamine having a molecular weight of 230 to 400, or polyoxypropylenetriamine having a molecular weight of about 400.

18. A process as defined in claim 14 wherein the polyepoxide is a diglycidyl ether-bisphenol A resin, wherein in the hindered amine compound of formula I, R, $R^1$, $R^2$, $R^4$ and $R^5$ are hydrogen and $R^3$ is a direct bond and wherein the auxiliary curing agent is a polyoxypropylenediamine having a molecular weight of about 400.

19. A process as defined in claim 14 where the polyepoxide is a diglycidyl ether-bisphenol A resin, wherein in the hindered amine compound of Formula I, R, $R^1$, $R^2$, $R^4$ and $R^5$ are hydrogen and $R^3$ is a direct bond, wherein in the benzotriazole compound of Formula III $R^4$, $R^5$, and $R^{13}$ are hydrogen, $R^{14}$ is t-butyl, X is $X_B$ and $X_B$ is $-Z_x-R^{15}-[N(R^{16})-\{C(=O)\}_y-R^{17}-]_z$ and x and y are 0 and $R^{15}$ is 1,2-ethanediyl and wherein the auxiliary curing agent is a polyoxypropylenediamine having a molecular weight of about 400.

20. A process of stabilizing synthetic polymers against the degradative effects of heat and/or light, which comprises adding to said polymers an effective amount of at least one reaction product of one or more polyepoxides as defined in claim 1 and a hindered amine compound of formula I, formula II or mixtures thereof as defined in claim 1 to stabilize said polymers against the degradative effects induced by heat and light.

21. A polymer composition comprising a synthetic polymer which is subject to thermal, or actinic light induced degradation and an effective amount of the composition of claim 11 to stabilize the polymer composition against the degradative effects induced by heat or light.

22. A composition as defined in claim 21 wherein the synthetic polymer is selected from polystyrene, rubber modified polystyrene, polyolefins, polyphenylene ethers, polyamides or mixtures thereof.

23. A composition as defined in claim 21 wherein the synthetic polymer is an epoxy resin.

24. A process for stabilizing synthetic polymers against the degradative effects of heat and/or light, which comprises adding to the polymers an effective amount of a composition of claim 10 to stabilize said polymers against the degradative effects induced by heat and light.

25. A polymer composition comprising a synthetic polymer which is subject to thermal, or actinic light induced degradation and an effective amount of the composition of claim 10 to stabilize the polymer composition against the degradative effects induced by heat or light.

26. The composition of claim 25 wherein the synthetic polymer is selected from polystyrene, rubber modified polystyrene, polyolefins, polyphenylene ethers, polyamides or mixtures thereof.

27. The composition of claim 25 wherein the synthetic polymer is an epoxy resin.

28. A polymer composition comprising a synthetic polymer composition which is subject to thermal, or actinic light degradation and an effective amount of the product of the reaction of one or more polyepoxides as defined in claim 1 and a hindered amine compound of formula I, formula II, or mixtures thereof as defined in claim 1 to stabilize the polymer composition against the degradative effects induced by heat or light.

29. A composition as defined in claim 28 wherein the synthetic polymer is selected from polystyrene, rubber modified polystyrene, polyolefins, polyphenylene ethers, polyamides or mixtures thereof.

30. A composition as defined in claim 28 wherein the synthetic polymer is an epoxy resin.

* * * * *